US012306102B2

United States Patent
Mehta et al.

(10) Patent No.: US 12,306,102 B2
(45) Date of Patent: May 20, 2025

(54) METHOD AND SYSTEM FOR QUANTITATIVE THREE DIMENSIONAL MEASUREMENT OF DENSITY, ANISOTROPY, AND ORIENTATION WITHOUT LABEL

(71) Applicant: CZ Biohub SF, LLC, San Francisco, CA (US)

(72) Inventors: Shalin Mehta, San Francisco, CA (US); Li-Hao Yeh, San Francisco, CA (US); Ivan Ivanov, San Francisco, CA (US)

(73) Assignee: CZ Biohub SF, LLC, San Francisco, CA (US)

( * ) Notice: Subject to any disclaimer, the term of this patent is extended or adjusted under 35 U.S.C. 154(b) by 134 days.

(21) Appl. No.: 18/055,988

(22) Filed: Nov. 16, 2022

(65) Prior Publication Data

US 2023/0080237 A1    Mar. 16, 2023

Related U.S. Application Data

(63) Continuation of application No. PCT/US2021/034028, filed on May 25, 2021.
(Continued)

(51) Int. Cl.
*G01N 21/64*        (2006.01)
*G01N 21/21*        (2006.01)
(Continued)

(52) U.S. Cl.
CPC ......... *G01N 21/6456* (2013.01); *G01N 21/21* (2013.01); *G01N 21/6486* (2013.01);
(Continued)

(58) Field of Classification Search
CPC .............. G01N 21/6456; G01N 21/21; G01N 21/6486; G01N 2201/127; G01N 21/4795;
(Continued)

(56) References Cited

U.S. PATENT DOCUMENTS

2004/0125373 A1    7/2004    Oldenbourg et al.
2005/0007590 A1    1/2005    Shribak et al.
(Continued)

OTHER PUBLICATIONS

Guo et al., Revealing Architectural Order with Quantitative Label-free Imaging and Deep Learning, Available Online at: https://doi.org/10.1101/631101, Nov. 23, 2019, pp. 1-29.
(Continued)

*Primary Examiner* — Tarifur R Chowdhury
*Assistant Examiner* — Kaitlyn E Kidwell
(74) *Attorney, Agent, or Firm* — Kilpatrick Townsend & Stockton LLP

(57) ABSTRACT

A method of measuring optical properties of a specimen, for example, a uniaxial specimen, includes generating a plurality of illumination patterns incident on the specimen and, for each of the plurality of illumination patterns, collecting sample light passing through the specimen and detecting the collected sample light using a polarization state analyzer to form a set of polarization channels. The method also includes receiving a calibration tensor, converting the set of polarization channels for each of the illumination patterns into Stokes parameter maps using the calibration tensor, and deconvolving the Stokes parameter maps to provide volumetric measurement of permittivity tensor of the specimen, specifically, absorption, optical path length, optical anisotropy, and 3D orientation of the specimen.

20 Claims, 15 Drawing Sheets

Related U.S. Application Data

(60) Provisional application No. 63/030,841, filed on May 27, 2020.

(51) Int. Cl.
*G02B 21/16* (2006.01)
*G02B 21/18* (2006.01)
*G02B 21/36* (2006.01)

(52) U.S. Cl.
CPC ............. *G02B 21/16* (2013.01); *G02B 21/18* (2013.01); *G02B 21/365* (2013.01); *G01N 2201/127* (2013.01)

(58) Field of Classification Search
CPC ...... G02B 21/16; G02B 21/18; G02B 21/365; G02B 5/201; G02B 5/3058; G02B 27/283; G02B 21/0092; G02B 21/367
See application file for complete search history.

(56) References Cited

U.S. PATENT DOCUMENTS

| | | | |
|---|---|---|---|
| 2016/0154229 A1* | 6/2016 | Milner | G01N 21/23 348/79 |
| 2018/0246307 A1 | 8/2018 | Rogers et al. | |
| 2019/0324254 A1* | 10/2019 | Sirat | G02B 21/0056 |
| 2020/0134773 A1* | 4/2020 | Pinter | G01N 21/8806 |

OTHER PUBLICATIONS

International Application No. PCT/US2021/034028, International Preliminary Report on Patentability mailed on Dec. 8, 2022, 10 pages.
International Application No. PCT/US2021/034028, International Search Report and Written Opinion mailed on Nov. 12, 2021, 13 pages.
International Application No. PCT/US2021/034028, Invitation to Pay Additional Fees and, Where Applicable, Protest Fee mailed on Jul. 30, 2021, 2 pages.

\* cited by examiner

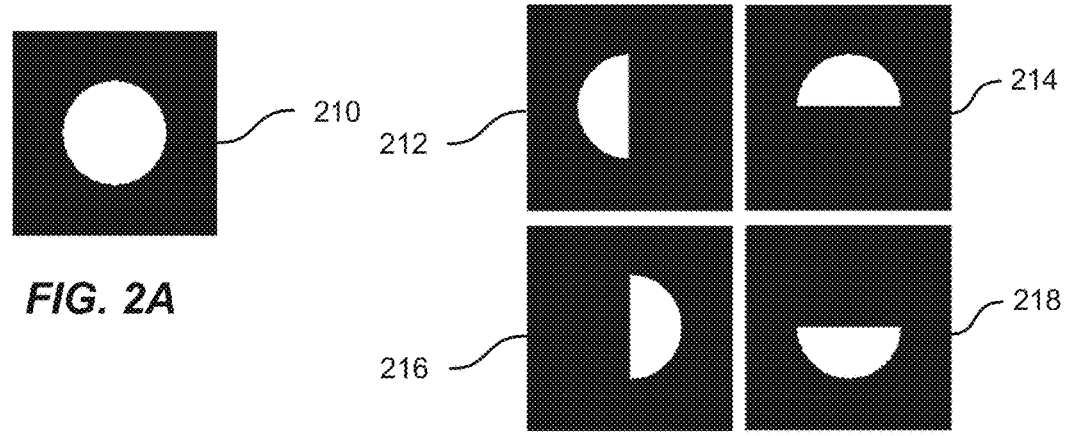
FIG. 2A
FIG. 2B
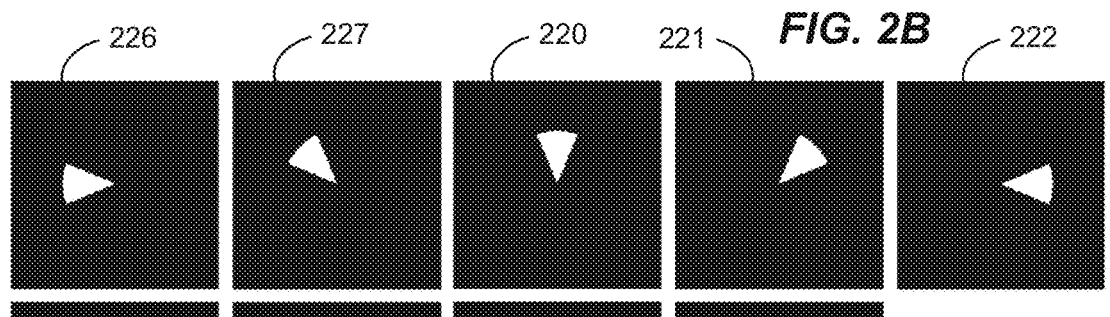
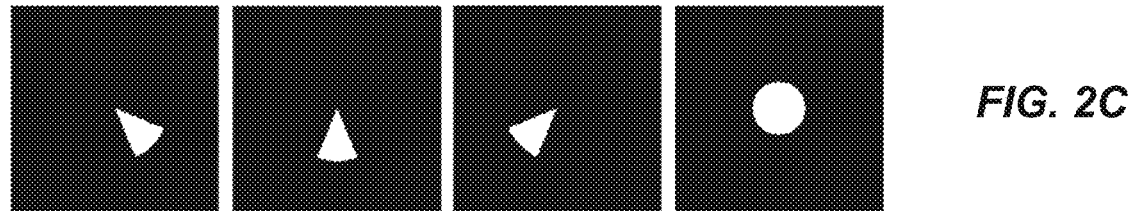
FIG. 2C
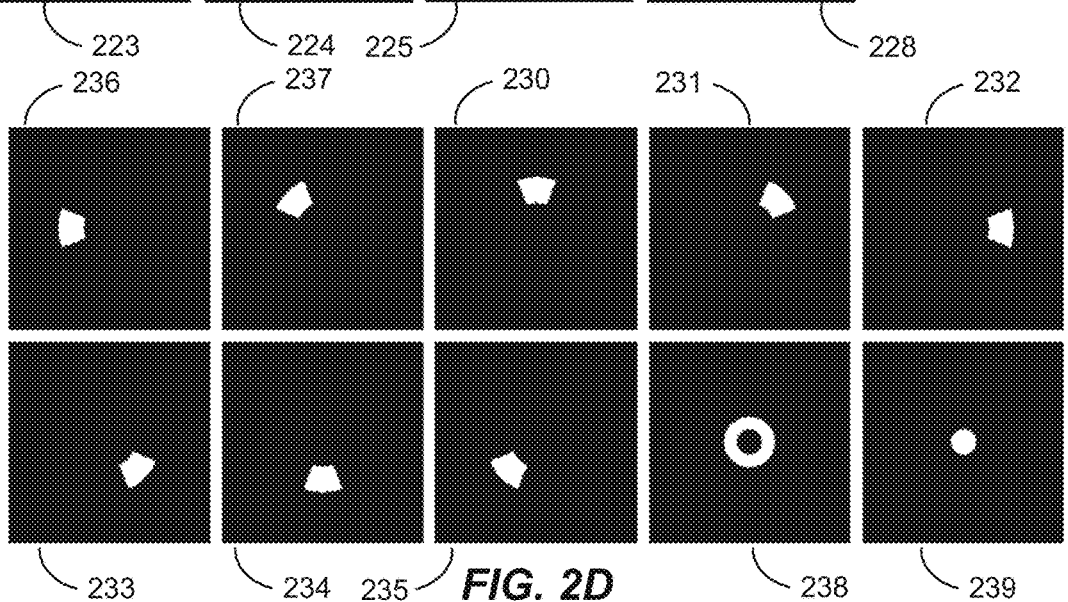
FIG. 2D

FIG. 5

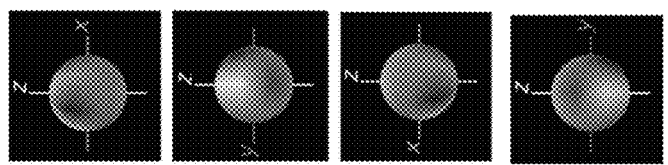
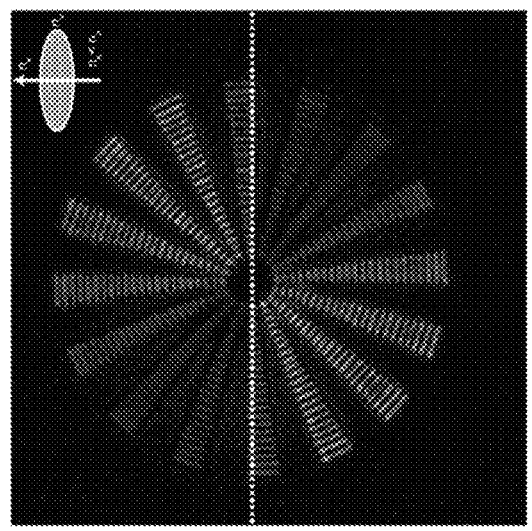
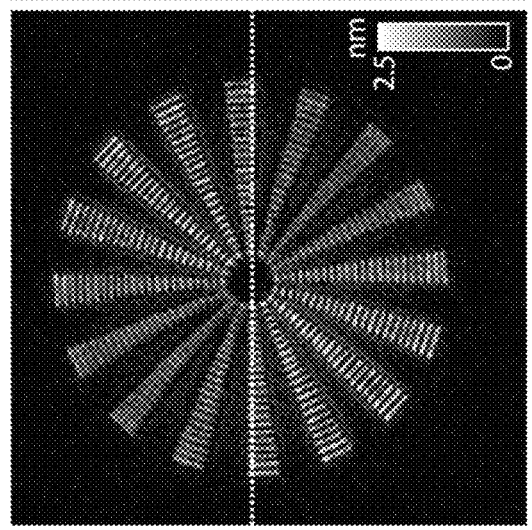
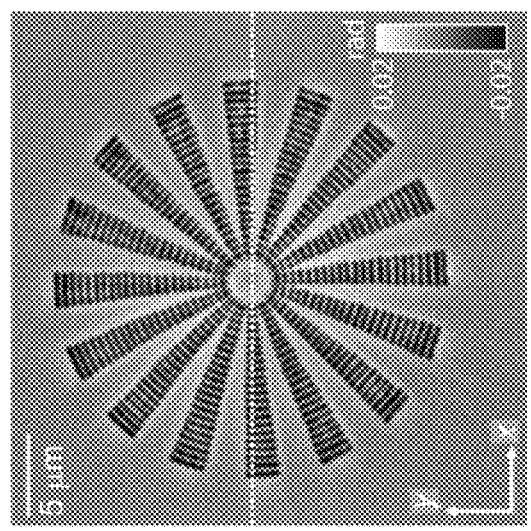
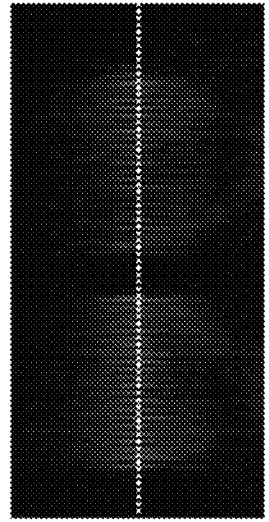
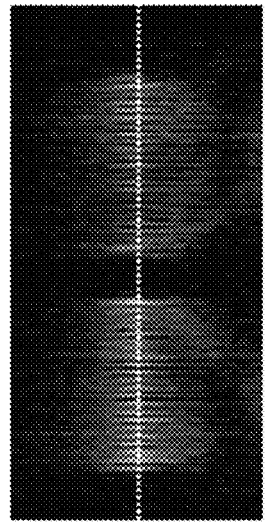
FIG. 7A  FIG. 7B  FIG. 7C  FIG. 7D  FIG. 7E  FIG. 7F  FIG. 7G

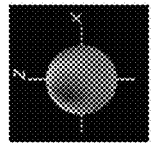 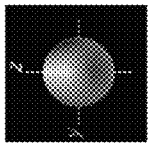 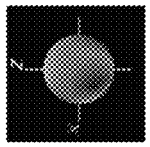 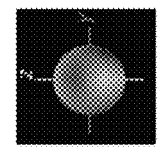
*FIG. 8J*
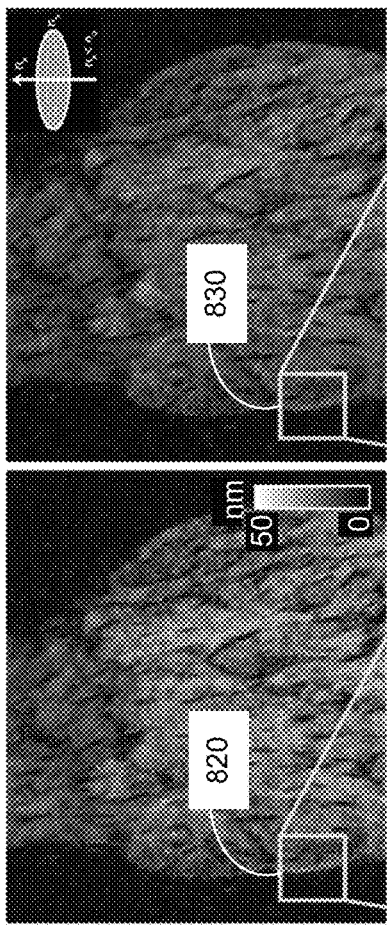
*FIG. 8G* *FIG. 8D* *FIG. 8A*
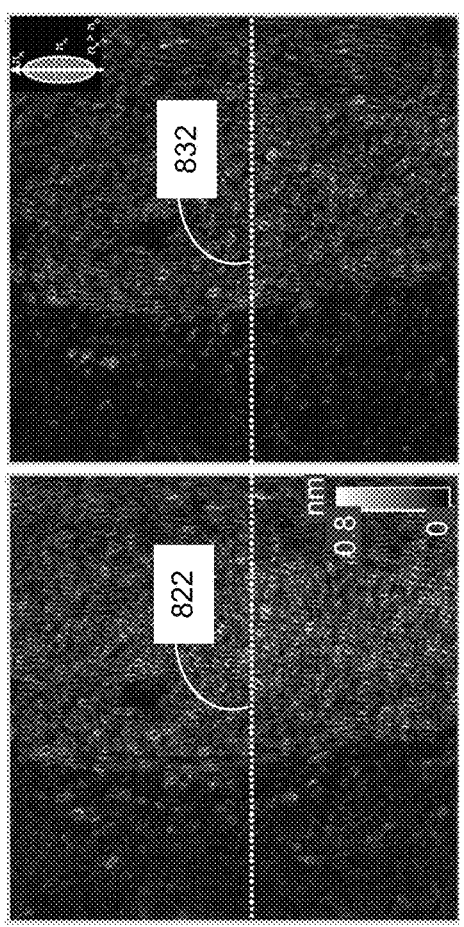
*FIG. 8H* *FIG. 8E* *FIG. 8B*
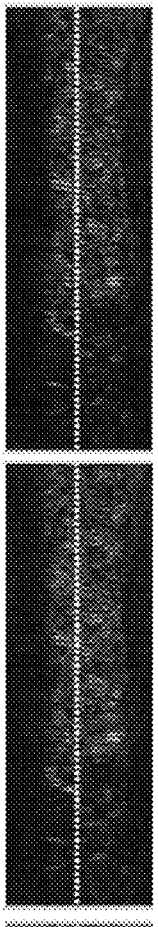
*FIG. 8I* *FIG. 8F* *FIG. 8C*

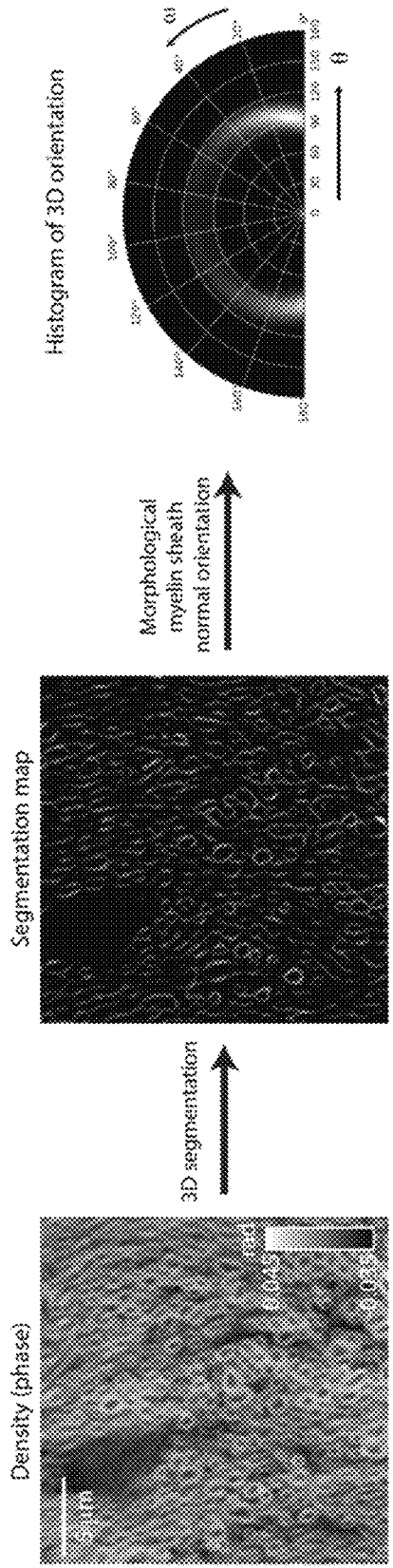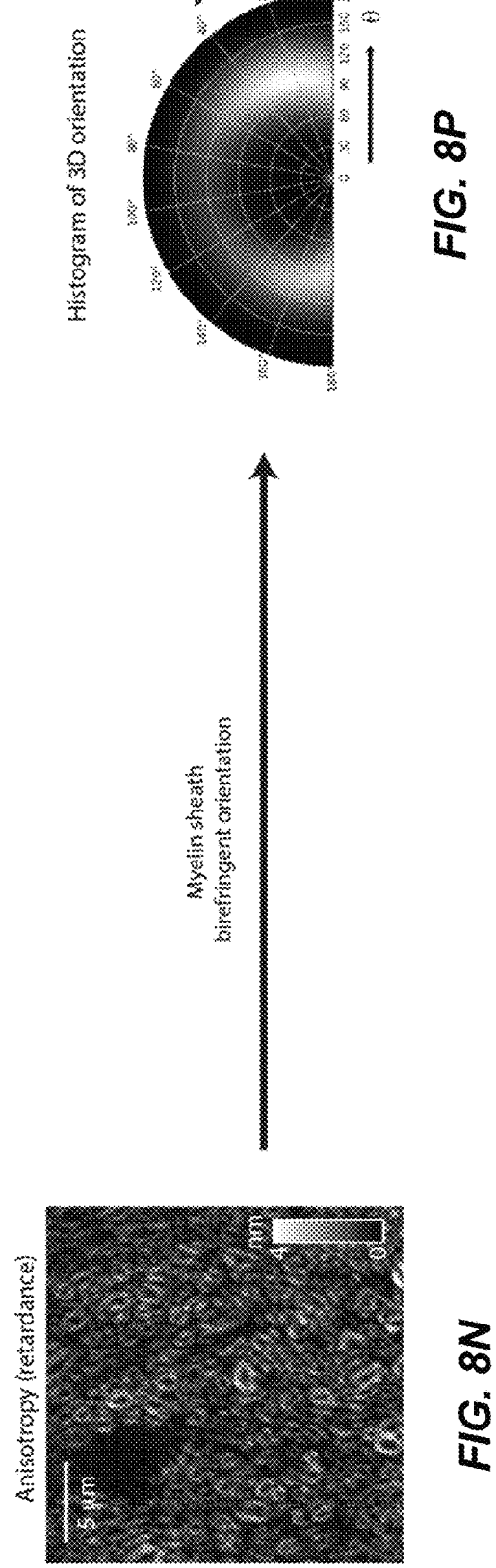

METHOD AND SYSTEM FOR QUANTITATIVE THREE DIMENSIONAL MEASUREMENT OF DENSITY, ANISOTROPY, AND ORIENTATION WITHOUT LABEL

CROSS-REFERENCES TO RELATED APPLICATIONS

This application is a continuation of International Patent Application No. PCT/US2021/034028, filed May 25, 2021, entitled "Method and System for Quantitative Three Dimensional Measurement of Density, Anisotropy, and Orientation Without Label," which claims priority to U.S. Provisional Patent Application No. 63/030,841, filed on May 27, 2020, entitled "Method and System for Quantitative Three Dimensional Measurement of Density, Anisotropy, and Orientation Without Label," the disclosures of which are hereby incorporated by reference in their entirety for all purposes.

BACKGROUND OF THE INVENTION

Various methods have been used to measure biological architecture and activity. Optical microscopy has opened a unique window into structures and processes in the liquid and solid phase. In order to develop new therapeutics, it is important to map structure of human tissue and cells in healthy state, in disease state, and in response to therapeutic interventions. Further, understanding interactions of cells with other organisms, such as viruses, requires the ability to see organelles in human cells.

Despite the progress that has been made in microscopy and the measurement of optical properties of materials, there exists a need in the art for improved methods and systems for performing quantitative imaging of three dimensional (3D) density, 3D anisotropy, and 3D orientation of specimens without the use of labels.

SUMMARY OF THE INVENTION

Embodiments of the present invention relate generally to methods and systems for performing quantitative imaging of three-dimensional (3D) density, 3D anisotropy, and 3D orientation without the use of labels. Specimens suitable for measurement using embodiments of the present invention can include primary cells, such as microglia, non-model organisms that cannot be labeled genetically, tissue slices, slices of biopsy, or the like, in addition to cells from cell lines that may be labeled. In a particular embodiment, calibration and deconvolution are utilized to achieve concurrent or simultaneous imaging of structures in order to characterize 3D density (e.g., absorption and optical path length), 3D anisotropy (e.g., principal retardance and optic sign), and 3D orientation (i.e., azimuth and inclination) using polarization and illumination diversity. The embodiments described herein enable microscopy without labels and, therefore, are applicable to imaging of primary cells from organisms, small microscopic organisms, clinical tissue biopsy, cell cultures, optical storage devices, and liquid crystal devices. As will be evident to one of skill in the art, during imaging of a protein, an organelle, a cell, a tissue or the like, the use of labels can result in modification of the dynamic properties of the structure being imaged since the label can obstruct the function of the protein, organelle, cell, tissue, or the like. Even genetic labeling, which enables dynamic properties to be preserved, may not be applicable to primary samples.

Therefore, the ability to perform label-free imaging as described herein, opens up new windows of possibility for a wide range of biological imaging applications. Even when genetic labeling is practical, the ability to multiplex label-free imaging described herein provides information on tissue and cellular landmarks that are not accessible with a molecular label.

Macromolecular components of biological systems (nucleic acids, amino acids, lipids, and glycans) form asymmetric assemblies, which underpin the shape of organelles, cells, and tissues, and the forces that shape them. The biomolecules are dielectric at visible wavelengths, i.e., the electrons bound to biomolecules oscillate in response to an applied electric field, but do not flow. The spatio-angular architecture of biological material is described by the spatial distribution of the permittivity tensor, which is the capacity of the material to store electrical energy as a function of the direction and polarization of the incident light. To be more specific, the relative permittivity is a measure of how easily bound electrons in a material are polarized by an applied electric field. Note that the polarization of material is its capacity to store electrical energy, whereas the polarization of light is the plane of oscillation of the electric field. The more easily a material is polarized, the more it delays the electromagnetic wave travelling through it, and the more optically dense the material is. If the bound electrons resonate with the incident optical frequency, the material absorbs the light. At visible wavelengths, biological specimens typically induce substantial phase delay, but negligible absorption, which makes them transparent. The permittivity of an isotropic material formed by disordered molecules, such as water, is a scalar independent of the direction and the polarization of the incident light. The permittivity of an anisotropic material formed by aligned molecules, such as collagen or lipid bi-layer, is a tensor that depends on the direction and polarization of the incident light. The permittivity tensor (PT) of a complex specimen can be decomposed into the isotropic component that reports the local density of macromolecules and the anisotropic component that reports the local angular distribution of macromolecules. The permittivity tensor is mathematically analogous to, but physically distinct from, the diffusion tensor that is commonly measured with diffusion-weighted magnetic resonance imaging (MRI). The permittivity tensor reports the architectural symmetries at the scale of cells and tissues, just as the diffusion tensor reports the symmetries of neural connectivity.

In an embodiment of the present invention, an imaging apparatus is provided that includes a programmable illumination unit operable to illuminate a sample (for example, an unlabeled sample) at multiple angles and a microscope that is operable to transfer scattered light onto a detection unit. The imaging apparatus also includes a programmable polarization-state analyzer. The programmable polarization-state analyzer can be implemented in various manners according to embodiments of the present invention, including a) sequential detection with multiple polarization states; b) simultaneous or concurrent detection with a plurality of (e.g., four) separate cameras; and c) simultaneous detection with a single camera with a polarization filter positioned in front of individual pixels, in which the single camera acts as a linear Stokes polarimeter. As described more fully herein, the anisotropy of structures, for example, axons in brain tissue, can be determined by measuring the polarization sensitivity of the structure using polarization-resolved imaging.

In a particular embodiment, quantitative, label-free, 3D density, anisotropy, and orientation imaging can be performed by computing Stokes parameters at different illumination angles by multiplying through-focus intensities for each of four channels collected at different illuminations angles with a pre-calibrated matrix and computing 3D distribution of density (i.e., absorption and optical path length), 3D anisotropy (i.e., principal retardance and optic sign), and 3D orientation (i.e., azimuth and inclination) utilizing a deconvolution method.

According to an embodiment of the present invention, a system is provided. The system includes an illumination source and a specimen stage operable to support a specimen. The system also includes imaging optics, a polarization state analyzer optically coupled to the imaging optics, and one or more processors in communication with the illumination source and the polarization state analyzer. The one or more processors are configured to perform operations comprising generating a plurality of illumination patterns, rotating a calibration target at a plurality of orientations for each illumination pattern, and receiving an array of multiple sets of polarization-resolved images from the polarization state analyzer. The one or more processors are further configured to perform operations comprising converting multiple sets of polarization-resolved images at known orientations of a calibration target into a calibration tensor for each illumination pattern, receiving a calibration tensor associated with the imaging optics for each illumination pattern, converting the array of multiple sets of polarization-resolved images into Stokes parameter maps, and deconvolving the Stokes parameter maps to provide 3D density, 3D anisotropy, and 3D orientation measurements of the specimen.

According to another embodiment of the present invention, a method of measuring optical properties of a specimen is provided. The method includes generating a plurality of illumination patterns incident on the specimen and for each of the plurality of illumination patterns: collecting sample light passing through the specimen and detecting the collected sample light using a polarization state analyzer to form a set of polarization channels. The method also includes receiving a calibration tensor, converting the set of polarization channels for each of the illumination patterns into Stokes parameter maps using the calibration tensor, and deconvolving the Stokes parameter maps to provide 3D density, 3D anisotropy, and 3D orientation measurements of the specimen.

According to an embodiment of the present invention, the specimen can be a uniaxial specimen. The method can also include translating the specimen, collecting additional sample light passing through the specimen, and detecting the additional sample light using the polarization state analyzer to form a set of additional polarization channels. The specimen can be disposed in an image plane and translating the specimen can include motion orthogonal to the image plane. Collecting sample light can include focusing the sample light onto image sensors of the polarization state analyzer. The calibration tensor can be associated with imaging optics. The specimen can include primary cells from an organism or intact microscopic organism. The specimen can include optical glass including a laser etched structure or liquid crystal material. The specimen can include a sample from clinical biopsy or cell culture. The polarization state analyzer can include a set of polarization processing optics and set of four cameras, each camera of the set of four cameras being operable to image light in one of four distinct polarization states. Each set of polarization resolved images can include a first image obtained by selecting light having a circular polarization state, a second image obtained by selecting light having an elliptical polarization state aligned with 0°, a third image obtained by selecting light having an elliptical polarization state aligned with 60°, and a fourth image obtained by selecting light having an elliptical polarization state aligned with 120°. The method can further include illuminating the specimen with fluorescent excitation light, collecting fluorescent emission light emitted from the specimen, and detecting the fluorescent emission light. Generating a plurality of illumination patterns incident on the specimen and illuminating the specimen with fluorescent excitation light can be performed sequentially.

According to a specific embodiment of the present invention, a method of measuring optical properties of a specimen is provided. The method includes a) positioning the specimen at a predetermined axial position $z_i$, b) generating a predetermined illumination pattern $P_j$, c) directing the predetermined illumination pattern to be incident on the specimen, and d) collecting sample light passing through the specimen. The method also includes e) forming a set of polarization channels of the specimen associated with the predetermined axial position and the predetermined illumination pattern, f) incrementing j to j+1 to define an updated predetermined illumination pattern $P_{j+1}$; and g) repeating b) through f) a plurality of times to provide multiple sets of polarization channels of the specimen. The method further includes h) incrementing i to i+1 to define an updated predetermined axial position $z_{i+1}$, repeating a) through h) a plurality of times to provide an array of multiple sets of polarization channels of the specimen, receiving a calibration tensor, converting the array of multiple sets of polarization channels into Stokes parameter maps using the calibration tensor, and deconvolving the Stokes parameter maps to provide volumetric measurement of 3D density, 3D anisotropy, and 3D orientation measurements of the specimen.

According to an embodiment of the present invention, the 3D density of the uniaxial specimen can define absorption and optical path length characteristics, the 3D anisotropy of the uniaxial specimen can defend principal retardance and optic sign, and the 3D orientation of the uniaxial specimen can define azimuth and inclination of the uniaxial specimen. The method can additionally include defining a positive or negative sign of anisotropy prior to deconvolving the Stokes parameter maps, and estimating the sign of anisotropy by analyzing volumetric variations in optical anisotropy and 3D orientation. Defining the positive or negative sign of anisotropy can include analyzing volumetric variations in optical anisotropy and 3D orientation. The set of polarization channels can include a plurality of polarization channels. The set of polarization channels can include a first image obtained using light having a polarization state aligned with 0°, a second image obtained using light having a polarization state aligned with 45°, a third image obtained using light having a polarization state aligned with 90°, and a fourth image obtained using light having a polarization state aligned with 135°. The set of polarization channels can include a first image obtained using light having a circular polarization state, a second image obtained using light having an elliptical polarization state aligned with 0°, a third image obtained using light having an elliptical polarization state aligned with 60°, and a fourth image obtained using light having an elliptical polarization state aligned with 120°. The Stokes parameter maps can be deconvolved to provide a permittivity tensor of the uniaxial specimen. The permittivity tensor of the uniaxial specimen can be used to provide volumetric measurement of the density, anisotropy, orientation, and light scattering of the uniaxial specimen. The density can define absorption and optical path length characteristics, the anisotropy can define principal retardance, optic sign, and diattenuation characteristics, the orientation can define azimuth and inclination characteristics, and the light scattering can define depolarization characteristics of the uniaxial specimen. The predetermined illumination pattern or the updated predetermined illumination pattern can include one of a set of sector illumination patterns or a circular illumination pattern. Each of the set of sector illumination patterns can be contiguous with adjacent sector illumination patterns. The set of sector illumination patterns can be characterized by a larger cone angle than the circular illumination pattern. The set of sector illumination patterns can be characterized by a highest achievable cone angle using a condenser lens using air, water, or oil immersion. The predetermined illumination pattern can be placed in an aperture plane of the condenser lens or imaged onto the aperture plane of the condenser lens. The predetermined illumination pattern or the updated predetermined illumination pattern can include one of a set of annular sector illumination patterns, an annular illumination pattern, or a circular illumination pattern. The uniaxial specimen can be disposed in an image plane orthogonal to the predetermined axial position. Forming the set of polarization channels of the uniaxial specimen can include capturing an image of the uniaxial specimen using a set of four cameras, each camera of the set of four cameras being operable to image one of four distinct polarization states. Forming the set of polarization channels of the uniaxial specimen can include capturing an image of the uniaxial specimen using a single camera having a polarization-resolved pixel format. Each set of polarization channels can include a plurality of images, each of the plurality of images being associated with one of the predetermined illumination pattern or the updated predetermined illumination pattern. The predetermined illumination pattern or the updated predetermined illumination pattern can include a plurality of angularly defined illumination patterns.

According to a specific embodiment of the present invention, a system is provided. The system includes an illumination source operable to generate a plurality of illumination patterns, a specimen stage operable to support a specimen, imaging optics, and a polarization state analyzer optically coupled to the imaging optics. The polarization state analyzer includes a set of polarization processing optics and a polarization-resolved imaging system operable to image light in one of four distinct polarization states. The illumination source can include a liquid crystal display panel. The illumination source can include a light emitting diode array. The illumination source can include a circular polarizer. The plurality of illumination patterns can include a brightfield pattern and a plurality of angularly defined illumination patterns. An illumination numerical aperture of the plurality of angularly defined illumination patterns can be greater than an illumination numerical aperture of the brightfield pattern. The illumination numerical aperture of the plurality of angularly defined illumination patterns can be 1.4 and the illumination numerical aperture of the brightfield pattern can be 0.7. The plurality of angularly defined illumination patterns can include eight azimuthally rotated illumination patterns, each of the eight azimuthally rotated illumination patterns being characterized by a shape of a 45° sector. The polarization-resolved imaging system can include a set of four cameras, each camera of the set of four cameras being operable to image light in one of the four distinct polarization states. The polarization state analyzer can further include a beamsplitter operable to direct light along a first optical path or a second optical path, a first polarizing beamsplitter disposed along the first optical path and operable to direct light having a first polarization state to a first lens and a first camera of the set of four cameras and direct light having a third polarization state orthogonal to the first polarization state to a third lens and a third camera of the set of four cameras, a half wave plate disposed along the second optical path, and a second polarizing beamsplitter disposed along the second optical path and operable to direct light having a second polarization state to a second lens and a second camera of the set of four cameras and direct light having a fourth polarization state orthogonal to the second polarization state to a fourth lens and a fourth camera of the set of four cameras. The first camera can be operable to capture a first image obtained using light having a polarization state aligned with 0°, the second camera can be operable to capture a second image obtained using light having a polarization state aligned with 45°, the third camera can be operable to capture a third image obtained using light having a polarization state aligned with 90°, and the fourth camera can be operable to capture a fourth image obtained using light having a polarization state aligned with 135°. The polarization-resolved imaging system can include a single camera having a polarization-resolved pixel format. The system can further include a fluorescent excitation source and a fluorescence imaging path optically coupled to the fluorescent excitation source.

Numerous benefits are achieved by way of the present invention over conventional techniques. For example, embodiments of the present invention provide the capability to perform comprehensive, quantitative, reproducible, and consistent measurements of density and anisotropy (including orientation) without the use of labels with high spatial and angular resolution over an entire volume. Embodiments of the present invention measure the permittivity tensor of a uniaxial material throughout the sample volume. This measurement resembles, but is different from, measurement of the diffusivity tensor with diffusion weighted magnetic resonance imaging. Moreover, using the systems and methods described herein, label-free measurements of 3D orientation can be made to reveal the architecture of a specimen, which can be clinical tissues, live primary cells, small organisms, and organelles. Furthermore, embodiments of the present invention enable multiplexing with other imaging modalities, such as fluorescence imaging. Additionally, embodiments of the present invention enable scalable systems that can be integrated with existing imaging systems by the addition of modules to existing imaging systems' illumination and detection paths.

Embodiments of the present invention are applicable to a variety of commercial and/or medical applications including digital pathology, enabling the rapid screening of tissue and imaging of cellular changes due to disease; and neuroscience, including the mapping of connectivity and myelination patterns in in vivo samples of a living animal (e.g., mouse, human, and primate brains). Moreover, embodiments of the present invention facilitate the comprehensive metrology of anisotropic materials, for example, the characterization of liquid crystals used in visual displays during development and/or manufacturing. Furthermore, the method and systems described herein are applicable to the measurement of strain during the manufacturing process for semiconductor substrates and for reading out optical storage media.

These and other embodiments of the invention along with many of its advantages and features are described in more detail in conjunction with the text below and attached figures.

BRIEF DESCRIPTION OF THE DRAWINGS

FIGS. 2A-2D are diagrams illustrating illumination patterns utilized according to embodiments of the present invention.

FIG. 5 illustrates components of a calibration tensor according to an embodiment of the present invention.

FIG. 7A is an image of density of a birefringent test target according to an embodiment of the present invention.

FIG. 7B is a cross-sectional view of density in the third dimension for the birefringent test target according to an embodiment of the present invention.

FIG. 7C is an image of anisotropy of the birefringent test target according to an embodiment of the present invention.

FIG. 7D is a cross-sectional view of anisotropy in the third dimension for the birefringent test target according to an embodiment of the present invention.

FIG. 7E is an image of 3D orientation of the birefringent test target according to an embodiment of the present invention.

FIG. 7F is a cross-sectional view of 3D orientation in the third dimension for the birefringent test target according to an embodiment of the present invention.

FIG. 7G is an orientation color sphere for interpretation of FIGS. 7E and 7F.

FIG. 8A is an image of density of a specimen according to an embodiment of the present invention.

FIG. 8B is an enlarged image of the density of the specimen shown in FIG. 8A.

FIG. 8C is a cross-sectional view of density in the third dimension for the specimen according to an embodiment of the present invention.

FIG. 8D is an image of anisotropy of the specimen according to an embodiment of the present invention.

FIG. 8E is an enlarged image of the anisotropy of the specimen shown in FIG. 8D.

FIG. 8F is a cross-sectional view of anisotropy in the third dimension for the specimen according to an embodiment of the present invention.

FIG. 8G is an image of 3D orientation of the specimen according to an embodiment of the present invention.

FIG. 8H is an enlarged image of the 3D orientation of the specimen shown in FIG. 8G.

FIG. 8I is a cross-sectional view of 3D orientation in the third dimension for the specimen according to an embodiment of the present invention.

FIG. 8J is an orientation color sphere for interpretation of FIGS. 8G-8I.

FIG. 8K is a reconstructed image of 3D density for the specimen according to an embodiment of the present invention.

FIG. 8L is a segmentation map after 3D segmentation according to an embodiment of the present invention.

FIG. 8M is a histogram of 3D orientation computed from spatial distribution of density according to an embodiment of the present invention.

FIG. 8N is a reconstructed image of 3D anisotropy for the specimen according to an embodiment of the present invention.

FIG. 8P is a histogram of 3D orientation corresponding to anisotropy according to an embodiment of the present invention.

DETAILED DESCRIPTION OF SPECIFIC EMBODIMENTS

Embodiments of the present invention relate generally to methods and systems for performing quantitative imaging of three dimensional (3D) density, 3D anisotropy, and 3D orientation of samples, for example, primary cells, human tissue slices, or the like, without the use of labels. In a particular embodiment, calibration and deconvolution are utilized to achieve concurrent or simultaneous imaging of structures in order to characterize 3D density, 3D anisotropy, and 3D orientation using polarization and illumination diversity.

Figure 1A:
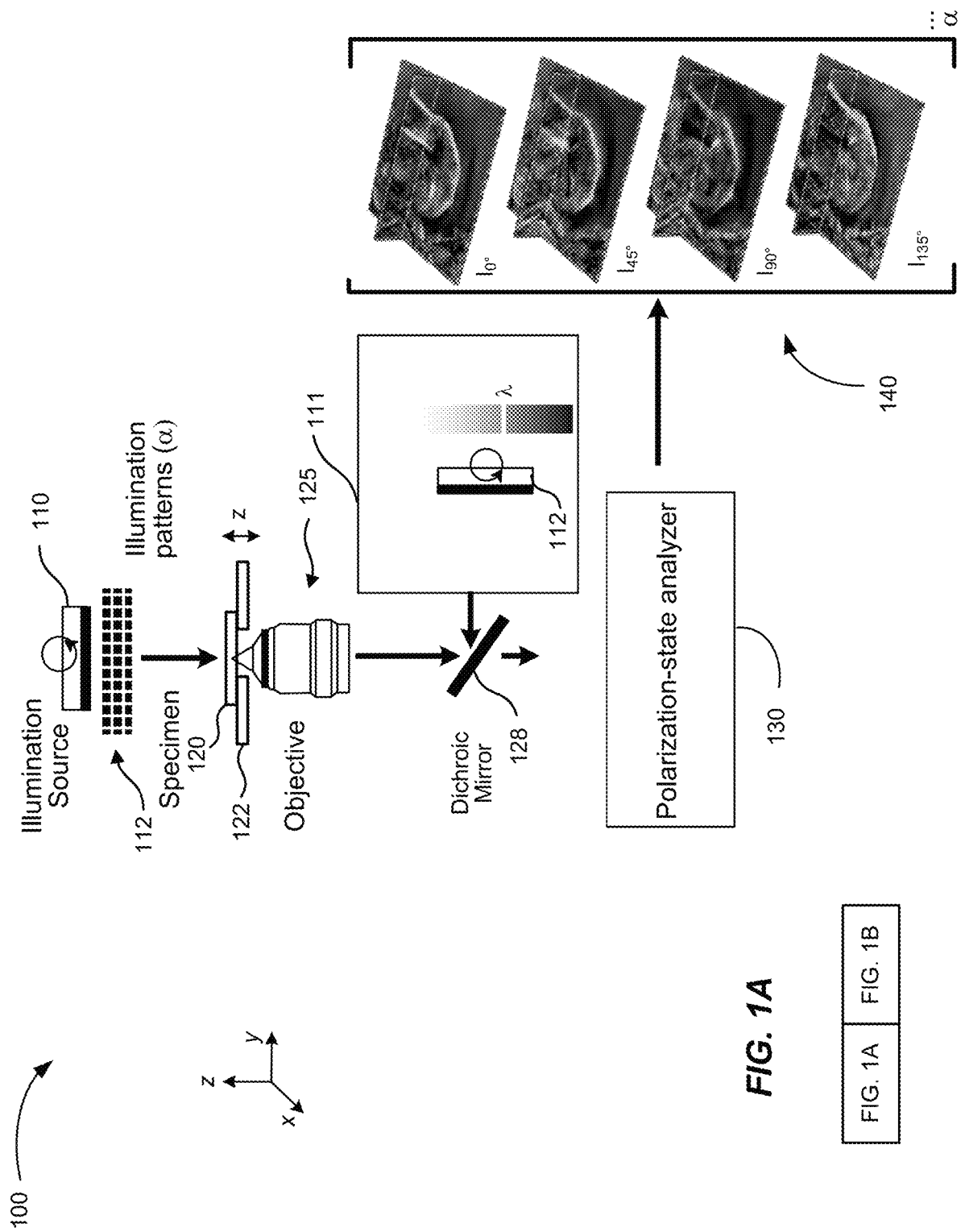
FIGS. 1A and 1B form a schematic diagram illustrating a data acquisition and processing system according to an embodiment of the present invention.
Figure 1B:
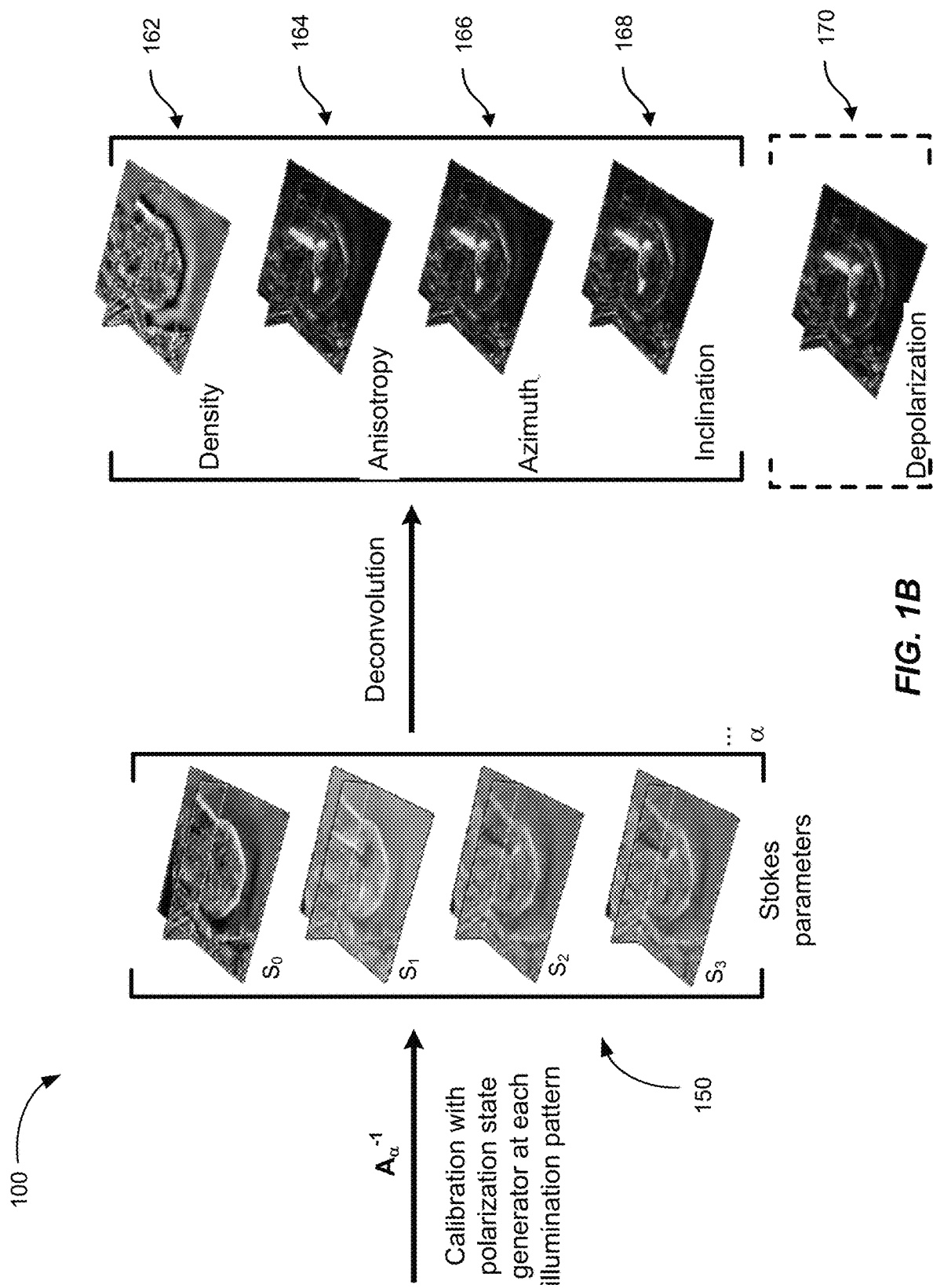

FIGS. 1A and 1B form a schematic diagram illustrating a data acquisition and processing system according to an embodiment of the present invention. The data acquisition and processing system can also be referred to as a polarization-resolved imaging apparatus or a polarization-resolved imaging system 100.

Referring to FIGS. 1A and 1B, polarized illumination, for example, circularly polarized illumination light, is provided by illumination source 110. The use of circularly polarized illumination light provides orientation independence in the measurements (i.e., orientation independence on the detection side) and enables the measurement of birefringence as the polarization illumination light interacts with birefringent specimens. In some embodiments, linearly polarized light is utilized to provide a diversity of input illumination light. Depending on the diversity of polarization states used for detection, the detection system can be a full Stokes polarimeter or a linear Stokes polarimeter. Full Stokes polarimetry reports the handedness of the circularly polarized light and utilizes elliptical states with a selected handedness. These embodiments allow recovery of depolarization by specimen, in addition to recovery of specimen anisotropy. In some embodiments, a single, four-channel polarization sensitive camera as illustrated in FIG. 3B is utilized as a linear Stokes polarimeter, providing simple alignment procedures to be implemented.

Figure 1C:
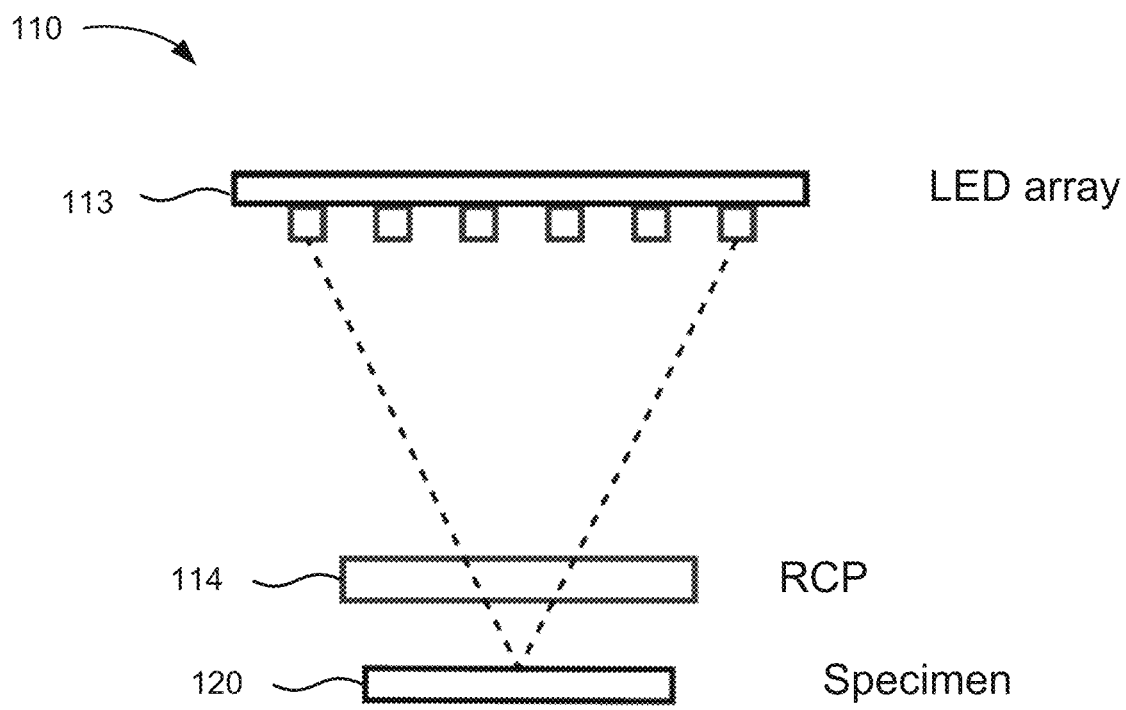
FIG. 1C illustrates an illumination source including a light emitting diode array according to an embodiment of the present invention.

As described more fully in relation to FIGS. 2A-2D, the illumination light is generated in a plurality of diverse illumination patterns. Referring to FIG. 1A, in an embodiment, illumination source 110 can be a light emitting diode (LED) array with individually controllable pixels. FIG. 1C illustrates an illumination source 110 including an LED array 113 according to an embodiment of the present invention. The illumination pattern 112 illustrated in FIG. 1A is formed by modulating the intensity of individual pixels in the LED array, thereby forming illumination patterns that are angularly defined. In some embodiments, the illumination source including the LED array can enable imaging at a numerical aperture of NA=0.7, NA=0.9, or the like. Right hand circular polarizer 114 is positioned between the LED array 113 and specimen 120 and produces right hand circularly polarized light. In other embodiments, left hand circularly polarized light is provided via use of a left hand circular polarizer.

Figure 1D:
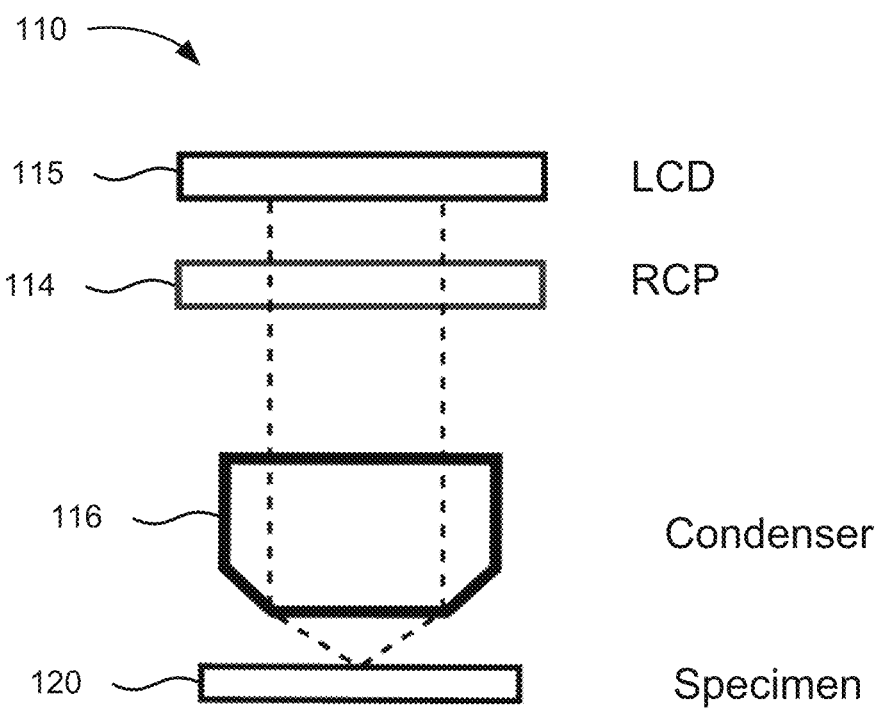
FIG. 1D illustrates an illumination source including an LCD panel according to an embodiment of the present invention.

In another embodiment, illumination pattern 112 is implemented using an illumination source 110 that includes a liquid crystal display (LCD) panel that filters light from a uniform source of illumination. FIG. 1D illustrates an illumination source 110 including an LCD panel 115 according to an embodiment of the present invention. In the embodiment illustrated in FIG. 1D, the LCD panel 115 is placed in the back focal plane of the condenser 116, enabling embodiments of the present invention to leverage a well-designed microscope condenser to achieve programmable, high-NA illumination. Right hand circular polarizer 114 is positioned between the LCD panel 115 and condenser 116, which focuses light on specimen 120, and produces right hand circularly polarized light. Utilizing illumination source 110 illustrated in FIG. 1D, numerical apertures on the order of 1.4 can be obtained.

Thus, illumination source 110 can include a light source and an LCD panel that is used to generate illumination pattern 112. In some cases, the LCD panel can produce higher-NA illumination than an LED array. Moreover, the use of an LCD panel enables finer optical sectioning over a smaller field of view. In some implementations, the LCD panel provides a more compact form factor than an LED array and can be incorporated into the light path of a microscope with an NA as high as 1.4 when integrated with an oil immersion condenser.

Light in each of these diverse illumination patterns 112 is directed to impinge on specimen 120, which is supported by specimen stage 122 at an axial position measured along the z-axis, resulting in a sample plane (x-y plane) over which the specimen is imaged. Specimen stage 122 is translatable in x, y, and z, enabling sampling of the specimen at different lateral positions as well as different axial positions, enabling the 3D imaging described herein. Objective 125 is utilized to collect light transmitted through specimen 120 so that this collected light can be imaged using polarization state analyzer 130.

In addition to operation in transmission imaging mode, embodiments of the present invention provide reflection source 111, also referred to as a fluorescent excitation source, that can enable a fluorescence imaging mode in which fluorophores in specimen 120 are excited by isotropically polarized light or unpolarized light via dichroic mirror 128. Thus, in fluorescence mode, the specimen is illuminated with fluorescent excitation light, fluorescent emission light emitted by specimen 120 is transmitted by dichroic mirror 128 (i.e., is collected by the appropriate optical elements), and the fluorescent emission light is detected by polarization state analyzer 130. Thus, in addition to label-free transmission imaging, fluorescence imaging utilizing labels can be performed. As an example, using multi-wavelength fluorescence imaging, the interaction of two fluorescent dipoles (e.g., cytoskeleton interacting with a cell membrane) can be imaged. It should be noted that in some embodiments, the use of reflection source 111 and the fluorescence imaging path can be used concurrently (e.g., simultaneously) or sequentially, with illumination source 110 and the transmission imaging path. Thus, embodiments of the present invention enable label-free imaging using illumination source 110 and the transmission imaging path as well as fluorescence imaging using reflection source 111 and the fluorescence imaging path with label(s).

Polarization state analyzer 130 is an accurate imaging Stokes polarimeter that is able to describe linear, circular, and elliptical states of polarization as well as the degree of polarization. Additional description related to polarization state analyzer 130 is provided in relation to FIGS. 3A-3C, which describe various optical arrangements that can be utilized to implement polarization state analyzer 130. In summary, polarization state analyzer 130 can be implemented using four polarization sensitive cameras and associated optics, a single, four-channel polarization sensitive camera, or a single camera operated in a sequential manner. The single polarization sensitive camera provides benefits including a simple alignment process for a given field of view. The use of four polarization sensitive cameras provides a larger field-of-view as described in relation to FIG. 6. Thus, for an illumination pattern with the specimen positioned at a given z-axis position (i.e., an axial position), polarization state analyzer 130 provides a set of polarization channels for each illumination pattern. As described more fully below, a number of different illumination patterns can be utilized to provide an array of sets of polarization channels.

Referring to FIGS. 1A and 1B, image array 140 includes a set of polarization channels for each illumination pattern ($\alpha$). Each set of polarization channels includes images that are formed by imaging the intensity in each of a set of polarization channels (i.e., linearly polarized along a direction aligned with 0° ($I_0°$), linearly polarized along a direction aligned with 45° ($I_{45}°$), linearly polarized along a direction aligned with 90° ($I_{90}°$), and linearly polarized along a direction aligned with)135° ($I_{135}°$) for the images illustrated in image array 140). As described more fully in relation to FIGS. 2A-2D, for example, the illumination patterns illustrated in FIG. 2C including 9 illumination patterns (i.e., eight sectors and a brightfield pattern) or the illumination patterns illustrated in FIG. 2D including 10 illumination patterns (i.e., eight annular sectors, an annulus, and a brightfield pattern) can be utilized to provide an image array including a set of four polarization channels (images $I_0°$, $I_{45}°$, $I_{90}°$, and $I_{135}°$) for each of the 9/10 illumination patterns, resulting in 36/40 polarization channels, i.e., multiple sets of polarization channels. Image array 140 is subsequently collected with the specimen positioned at different axial positions along the z-axis to provide an array of multiple sets of polarization channels.

As described herein, multiple, polarization-resolved images are obtained, using four cameras, a single camera with pixel sets that includes four polarization-resolved pixels, or the like to produce a set of polarization channels. The angularly defined illumination at different angles results in multiple sets of polarization channels. Multiple z-positions results in an array of multiple sets of polarization channels. Another nomenclature that can be utilized to describe embodiments of the present invention is that the cameras, also referred to as a detectors, produce an image array of 3-dimensions: x, y, and p (polarization channel) analogous to the set of polarization channels. The angularly defined illumination at different angles results in image array of 4-dimensions: x, y, p and α (i.e., angles) analogous to multiple sets of polarization channels. Multiple z-positions result in an image array of 5-dimensions: x, y, p, a, and z (i.e., depth) analogous to the array of multiple sets of polarization channels. In alternative embodiments, the order of acquisition of the dimensions a, z can be different, or only one of the dimensions a, z may be acquired. As will be evident to one of skill in the art, the 4-dimensional array x, y, p and a allows measurement of orientation (i.e., azimuth and inclination), anisotropy, and density in a single plane. Addition of measurements at multiple z-positions results in the extension to the 5-dimensional acquisition and the measurement of orientation, anisotropy, and density in 3D.

In order to determine the calibration tensor Aa for the imaging system, the imaging system is subjected to known Stokes vectors. As an example, a linear polarizer can be positioned on the specimen stage at the axial position at which specimens will be characterized and rotated to given polarization angles. For instance, the linear polarizer can be positioned such that the linear polarizer is aligned along a direction defined as 0°. At this setting for the linear polarizer, multiple sets of polarization-resolved images can be obtained for each of the illumination patterns. If the imaging system introduced no error, the image characterizing the intensity of the light having a polarization state aligned with 0° which can be referred to as image $I_0°$ would be a uniform image having a given intensity. The orthogonal polarization-resolved image $I_{90}°$ will be almost zero intensity, and the other (i.e., $I_{45}°$ and $I_{135}°$) state will have half the intensity.

A number of polarization states are utilized as inputs during the calibration process, with the linear polarizer being positioned such that the linear polarizer is aligned along a direction defined as the additional polarization states. For example, the polarization state can be varied so that polarization channels are collected every 1°, every 5°, or the like. For the input polarization states aligned with 45°, 90°, and 135°, uniform images for light having a polarization state aligned with the input polarization state would be obtained for these input polarization states. Thus, the detection path is subjected to a range of input polarization states (i.e., multiple linear states of polarization) to provide a well-defined set of known Stokes parameters.

Thus, the calibration tensor Aα, also referred to as an instrument tensor, provides a mathematical relationship between the image intensities as a function of polarization channel and illumination pattern and the true Stokes parameters in the sample plane.

Figure 5:
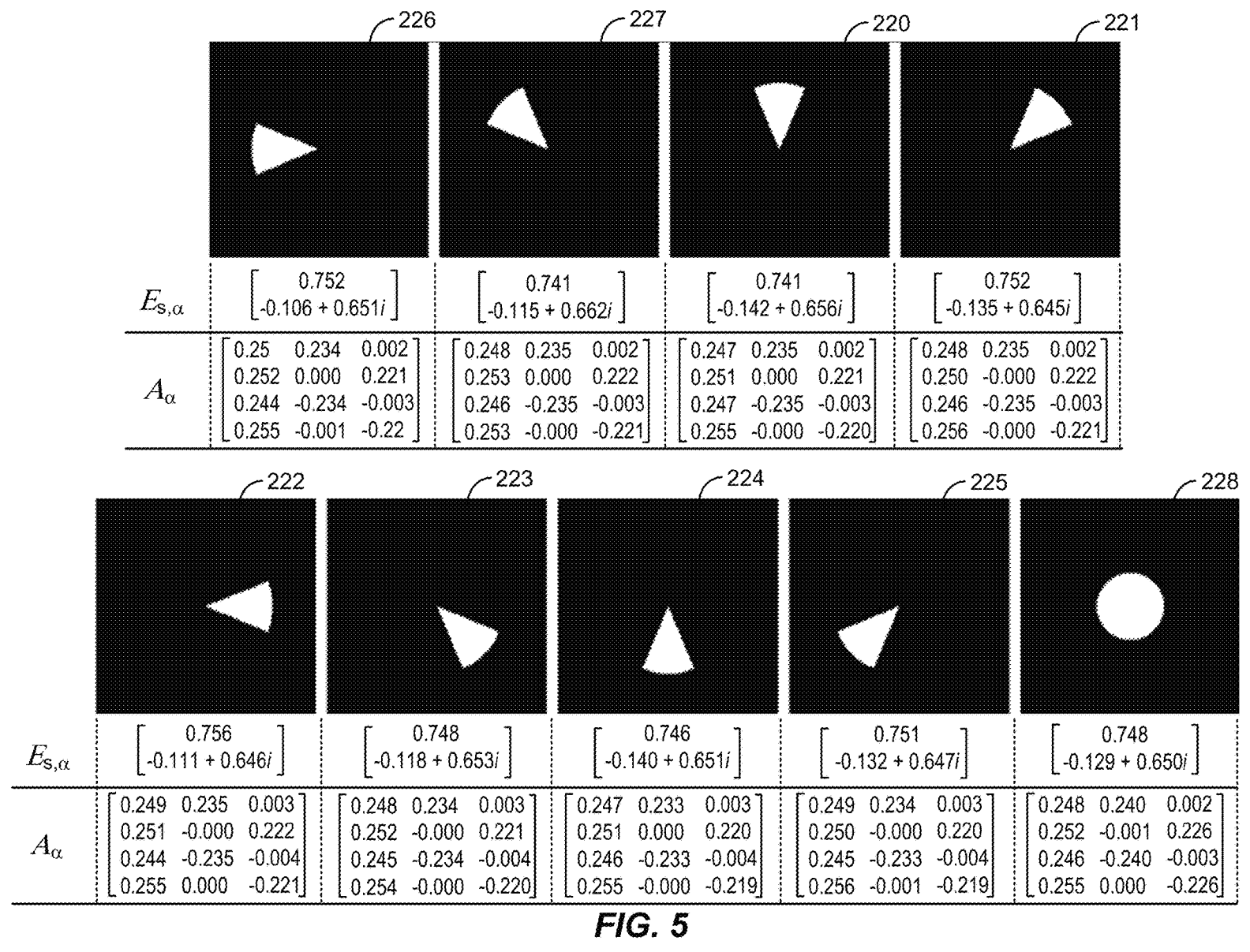

FIG. 5 illustrates components of a calibration tensor according to an embodiment of the present invention. In FIG. 5, the illumination patterns correspond to the illumination patterns illustrated in FIG. 2C and calibration tensor Aa is shown for each illumination pattern.

Starting with sector 226, the Jones vector ($E_{s,x,a}$) of illumination, which is the input to the deconvolution algorithm described more fully below in relation to Eq. (9), has values of $E_{s,x,a}$=0.752 and $E_{s,y,a}$=−0.106+0.651i. In this example, $E_{s,z,a}$ is assumed to be equal to zero. For this sector, the elements of the calibration tensor are shown, with the columns representing the dimension of Stokes parameters $S_0$, $S_1$, and $S_2$ and the rows representing the dimension of the polarization states $I_0°$, $I_{45}°$, $I_{90}°$, and $I_{135}°$. FIG. 5 also provides the Jones vectors and the elements of the calibration tensor for the other sectors illustrated in FIG. 2C.

In some implementations, the Jones vectors are calculated by first measuring the Stokes vector, but then transforming it into an "effective Jones vector" for use in the deconvolution algorithm (see Eq. (9)). This step essentially assumes that the polarization is the same across the whole illumination pattern, which is a fair assumption.

In some embodiments, in addition to determining the 3D density 162, 3D anisotropy 164, and 3D orientation 166 and 168, the depolarization 170 is also determined. With a linear Stokes polarimeter that is sensitive to three Stokes parameters (i.e., $S_0$, $S_1$, and $S_2$), depolarization cannot be deconvolved. By extending the detector to a full Stokes polarimeter that reports all four Stokes parameters (i.e., $S_0$, $S_1$, $S_2$, and $S_3$), depolarization can be deconvolved as illustrated by depolarization 170 in FIG. 1B. That is, utilizing illumination patterns characterized by both handedness (i.e., both right hand polarized and left hand polarized illumination patterns), full Stokes polarimetry is provided by some embodiments of the present invention. As will be evident to one of skill in the art, the anisotropy and the depolarization can be uncoupled by knowledge of the handedness of the illumination light.

Referring once again to FIGS. 1A and 1B, given the array of multiple sets of polarization channels 140, which can also be referred to as a stack of image arrays, and calibration tensor Aα, the sets of polarization channels for each illumination pattern, collected at a number of z-axis positions can be converted using the inverse of the calibration tensor (i.e., $A\alpha^{-1}$) into the Stokes parameters $S_0$, $S_1$, $S_2$, and $S_3$ (150). Given the Stokes parameters, a deconvolution operation can be performed to compute the 3D density 162, 3D anisotropy 164, and 3D orientation, which can be represented by azimuth 166 and inclination 168.

As will be evident to one of skill in the art, density variations, also referred to as phase variations, correspond to variation in the index of refraction and the integrated optical path length. Accordingly, density variations will act like a lens to incident light, resulting in a uniform incident wavefront becoming non-uniform. Thus, the density variation is retrieved from the intensity variation.

FIGS. 2A-2D are diagrams illustrating illumination patterns utilized according to embodiments of the present invention. As illustrated in FIGS. 2A-2D, diverse symmetric and asymmetric illumination patterns can be used to achieve different imaging modes. This illumination process is one way to achieve partially coherent illumination. The illumination patterns shown in FIGS. 2A-2D are taken in the x-y plane, for example, at the x-y plane in which the aperture of the illumination condenser lens is positioned. FIG. 2A illustrates brightfield pattern 210 that allows 2D or 3D imaging of projected retardance, 2D orientation, and density. In brightfield pattern 210, a single, symmetric illumination in a circular shape is generated and directed to impinge on the specimen.

In some embodiments, a light emitting diode (LED) array with individually controllable pixels is utilized to form the illumination patterns described herein, however, the present invention is not limited to the use of an LED array. The use of an LED array enables increased image throughput by illumination of a large field of view using a low magnification objective. As an example, an LED array can achieve a numerical aperture (NA) of 0.9 in some implementations. In other implementations, other light sources that can provide varied illumination patterns are utilized, including a spatially uniform source used in conjunction with variable geometry shutters, a spatially uniform source used in conjunction with a spatial light modulator such as pixelated LCD panel, liquid-crystal-on-silicon (LCOS) display, or the digital micromirror device (DMD) or the like.

FIG. 2B illustrates four half-circles as illumination patterns that enable fast 2D imaging of projected retardance, orientation, and density in a thin sample (e.g., ranging from ~100 µm in thickness to ~0.45 µm in thickness depending on the NA of the imaging optics) without having to scan in depth. In some implementations, the thickness of the sample is smaller than the depth of field of the imaging system, depending on the objective used for the measurement process. Since a higher magnification objective has shorter depth of field, the tolerable sample thickness will be smaller when using a higher magnification objective. Referring to FIG. 2B, illumination pattern 212 is a semicircle positioned in quadrants 2 and 3, illumination pattern 214 is a semicircle positioned in quadrants 1 and 2, illumination pattern 216 is a semicircle positioned in quadrants 1 and 4, and illumination pattern 218 is a semicircle positioned in quadrants 3 and 4. In order to provide illumination at different angles of incidence, illumination patterns 212-218 can be generated and directed to impinge on the specimen in a sequential manner. Although four semicircular illumination patterns are illustrated in FIG. 2B, embodiments of the present invention are not limited to this particular number of illumination patterns or this particular shape and other patterns can be utilized as described, for example, in relation to FIGS. 2C and 2D. As described herein, using each illumination pattern, polarization channels are obtained, providing a set of polarization channels for each illumination pattern, with the diverse illumination patterns thereby providing multiple sets of polarization channels.

FIG. 2C illustrates illumination patterns that can be used for 2D and 3D imaging of density (i.e., phase), anisotropy (i.e., principal retardance and optic sign), and 3D orientation as discussed herein. Referring to FIG. 2C, illumination patterns 220 through 227 define sectors of a circle having uniform angular and radial dimensions. As illustrated in FIG. 2C, each of the sectors, which can be referred to as sector illumination patterns, is contiguous with the two sectors adjacent the particular sector. That is, each of the sectors abuts the adjacent sectors. As an example, the left side of illumination pattern 220 is contiguous with the right side of illumination pattern 227 and the right side of illumination pattern 220 is contiguous with the left side of illumination pattern 221. For example, referring to FIG. 2C, a brightfield pattern 228 with an illumination NA of 0.7 can be followed by eight azimuthally rotating illumination patterns 220-227 that have shape of a 45° sector with a maximal illumination NA of 1.4.

Illumination pattern 220 is a sector with an angular dimension covering 337.5° to 22.5° starting from y-axis clockwise, illumination pattern 221 is a sector with an angular dimension covering 22.5° to 67.5°, illumination pattern 222 is a sector with an angular dimension covering 67.5° to 112.5°, illumination pattern 223 is a sector with an angular dimension covering 112.5° to 157.5°, illumination pattern 224 is a sector with an angular dimension covering 157.5° to 202.5°, illumination pattern 225 is a sector with an angular dimension covering 202.5° to 247.5°, illumination pattern 226 is a sector with an angular dimension covering 247.5° to 292.5°, and illumination pattern 227 is a sector with an angular dimension covering 292.5° to 337.5°. Illumination pattern 228 is a brightfield pattern that is a single, symmetric illumination in a circular shape. Illumination patterns 220-228 are generated and directed to impinge on the specimen in a sequential manner. Thus, using each illumination pattern, a set of polarization channels are obtained. With the diverse illumination patterns, multiple sets of polarization channels are obtained (i.e., nine sets of four polarization channels for the illumination patterns illustrated in FIG. 2C).

The inventors have determined that the use of the illumination patterns illustrated in FIG. 2C, which include brightfield pattern 210 in the form of brightfield pattern 228 as well as the illustrated sector-based illumination patterns enable the capability of performing high NA (i.e., NA=1.4) imaging, thereby improving imaging resolution and accuracy, while maintaining contrast, which can be lost as a result of the performance of high NA imaging. Thus, in contrast with conventional systems that utilize a single illumination pattern, for example, brightfield pattern 210, the use of a diversity of illuminations patterns as described herein enable high contrast, high resolution imaging.

FIG. 2D illustrates alternative illumination patterns that can be used for 2D and 3D imaging of density (i.e., phase), anisotropy (i.e., principal retardance), and 3D orientation as discussed herein. Referring to FIG. 2D, illumination pattern 238 is an annulus for which the radius of the inner circle of the annulus is approximately half of the radius of the outer circle of the annulus. Illumination pattern 239 is a brightfield pattern that is a single, symmetric illumination in a circular shape. The diameter of the brightfield pattern is equal to the inner radius of the annulus in illumination pattern 238.

Illumination patterns 230-237 define sectors of an annulus having uniform angular dimensions and predetermined radial dimensions. These illumination patterns are sectors of the annulus with outer radius two times that of the annulus shown in illumination pattern 238.

More particularly, illumination pattern 230 is a sector of an annulus with an angular dimension covering 337.5° to 22.5°, illumination pattern 231 is a sector of the annulus with an angular dimension covering 22.5° to 67.5°, illumination pattern 232 is a sector of the annulus with an angular dimension covering 67.5° to 112.5°, illumination pattern 233 is a sector of the annulus with an angular dimension covering 112.5° to 157.5°, illumination pattern 234 is a sector of the annulus with an angular dimension covering 157.5° to 202.5°, illumination pattern 235 is a sector of the annulus with an angular dimension covering 202.5° to 247.5°, illumination pattern 236 is a sector of the annulus with an angular dimension covering 247.5° to 292.5°, and illumination pattern 237 is a sector of the annulus with an angular dimension covering 292.5° to 337.5°.

Illumination patterns 230-239 are generated and directed to impinge on the specimen in a sequential manner. Thus, using each illumination pattern, a set of polarization channels are obtained. With the diverse illumination patterns, multiple sets of polarization channels are obtained (i.e., 10 sets of four polarization channels for the illumination patterns illustrated in FIG. 2D). In some embodiments, a modification of the illumination patterns illustrated in FIG.

2D can be utilized, with four annular sectors, each covering 90°, along with illumination patterns 238 and 239, providing a total of six illumination patterns. Utilizing one or more of the illumination patterns illustrated in FIGS. 2A-2D, or variations on those illumination patterns as described herein, embodiments of the present invention are able to achieve high levels of angular resolution for a wide range of possible azimuths and inclinations. Since the quality of reconstruction depends, in part, on the angular resolution of the illumination patterns, embodiments of the present invention can achieve nearly diffraction-limited resolution in both space and angle for specific numerical apertures of illumination and detection. In particular, the rotating sectors illustrated in FIGS. 2B, 2C, and 2D provide increasingly higher angular resolution for azimuthal and inclination measurements compared to FIG. 2A.

The number of sectors, the angular extent of the sectors, the radial dimensions of sectors of an annulus, and the like can be different than those illustrated in FIGS. 2A-2D. In some embodiments, a greater number of sectors results in the increase in the angular resolution, whereas, in other embodiments, a smaller number of sectors is used to obtain the multiple sets of polarization-resolved images more quickly, which results in lower angular resolution. In some embodiments, the particular illumination patterns can be selected based on simulations balancing measurement accuracy, measurement time, and the like. Moreover, variation of the illumination patterns can be utilized to modify the depth of field. Illumination patterns having a higher numerical aperture (NA) can be utilized to achieve a narrower depth of field, whereas, illumination patterns having a lower NA can be utilized to achieve a longer depth of field.

As will be evident to one of skill in the art, in order to provide enough illumination light while reducing or minimizing the number of measurements, illuminating in sectors (i.e., one way to achieve partially coherent illumination) can be utilized, in comparison with sequential illumination from individual angles. Thus, in combination with the calibration matrices, which can be modified depending on the particular implementation, the manner in which angular illumination is performed can be modified as appropriate to the particular implementation. One of ordinary skill in the art would recognize many variations, modifications, and alternatives.

In summary, utilizing angular diversity, embodiments of the present invention enable the problem of recovering the 3D density, 3D anisotropy, and the 3D orientation to be well posed, i.e., solvable.

Embodiments of the present invention are useful for imaging millimeter-sized tissue sections with sub-micron 3D resolution. For example, multi-scale imaging can be performed using a tiled acquisition technique, providing robust reconstruction at any scale spanned by the acquisition. Measurements at larger scales are computed by filtering the components of the scattering potential tensor, which are then transformed into phase, retardance, and 3D orientation. According to this method, at spatial scales larger than the typical size of axons, the 3D orientation is computed assuming a negative uniaxial material. When axon cross-sections are resolved, complex axon networks are visualized by displaying the phase and principal retardance through focus and at multiple locations. The inventors have determined that the 3D orientation of axons detected at low resolution follows the same trend as the 3D structural orientation of axons at high-resolution.

In order to confirm the usefulness of this method, the quantitative correspondence between 3D orientation distributions measured with low-resolution (e.g., 20×, 0.55NA) and high-resolution (e.g., 63×, 1.47NA) acquisitions was verified. The 3D orientation at high-resolution was imaged. The high-resolution data was then passed through a low-pass filter to generate data with spatial resolution similar to the spatial resolution of the low-resolution data and the 3D orientation histogram was computed. The inventors determined that the histograms of the 3D orientation of axon bundles in the low-resolution data and the smoothed 3D orientation computed from high-resolution data agree well, confirming that the embodiments described herein provide physically meaningful measurements across spatial scales. Additionally, these results indicate that embodiments of the present invention provide sensitive measurement of 3D anisotropy that may not be resolved spatially by the microscope. For example, when the spatial resolution is ~3 μm, embodiments of the present invention are able to report the 3D orientation of axons. Thus, the embodiments described herein provide significant enhancements over conventional techniques, for example a conventional fluorescence microscope in which the analysis of the 3D orientation of axons without polarization generally requires spatial resolution of ~250 nm to resolve single axons.

Referring once again to FIGS. 1A and 1B, operation in both a transmission imaging mode as well as a fluorescence imaging mode is implemented. Accordingly, in addition to label-free transmission imaging, fluorescence imaging utilizing labels can be performed. Embodiments of the present invention can perform multiplexed label-free and fluorescence measurements of specimens, providing imaging information not available using either technique independently. Using the polarization-resolved imaging system 100 illustrated in FIG. 1, two distinct fields of view (FOV) of the specimen can be obtained. Accordingly, label-free imaging can be multiplexed with labeled imaging, for instance, fluorescence imaging using multiple labels. As an example, during a first multiplexing window, transmission imaging using diverse illumination patterns can be performed to form images of phase and principal retardance of a specimen as described herein. Subsequently, during a second multiplexing window using reflection source 111, fluorescence imaging can be performed using one or more labels to form fluorescence images of the specimen in a sequential manner.

Figure 3A:
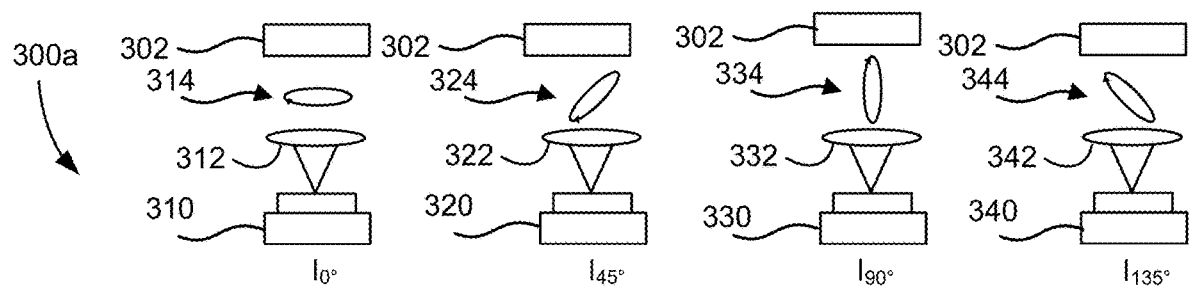
FIG. 3A is a simplified schematic diagram illustrating the use of multiple cameras to perform polarization-resolved imaging according to an embodiment of the present invention.
Figure 3B:
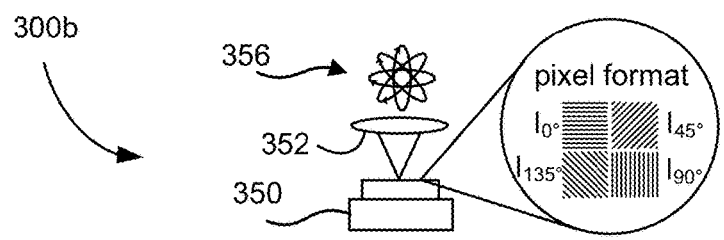
FIG. 3B is a simplified schematic diagram illustrating the use of a single polarization-sensitive camera to perform polarization-resolved imaging according to an embodiment of the present invention.

FIG. 3A is a simplified schematic diagram 300*a* illustrating the use of multiple cameras to perform polarization-resolved imaging according to an embodiment of the present invention. As discussed in more detail in relation to FIG. 6, light in a first polarization state 314 (e.g., light aligned with a direction of 0°) is incident on lens 312 that focuses light onto polarization-resolved camera 310. Accordingly, an image characterizing the intensity of the light having the first polarization state (i.e., $I_0°$) is detected using polarization-resolved camera 310. Light in a second polarization state 324 (e.g., light aligned with a direction of 45°) is incident on lens 322 that focuses light onto polarization-resolved camera 320. Accordingly, an image characterizing the intensity of the light having the second polarization state (i.e., $I_{45}°$) is detected using polarization-resolved camera 320. Light in a third polarization state 334 (e.g., light aligned with a direction of 90°) is incident on lens 332 that focuses light onto polarization-resolved camera 330. Accordingly, an image characterizing the intensity of the light having the third polarization state (i.e., $I_{90}°$) is detected using polarization-resolved camera 330. Light in a fourth polarization state 344 (e.g., light aligned with a direction of) 135° is incident on lens 342 that focuses light onto polarization-resolved camera 340. Accordingly, an image characterizing the intensity of the light having the fourth polarization state (i.e., $I_{135}°$) is detected using polarization-resolved camera 340.

In the embodiment illustrated in FIG. 3A, sensitive and economical machine vision cameras are utilized that provide excellent imaging performance for brightfield microscopy. In some cases, the time resolution of anisotropy measurements is limited by the acquisition frame rate of the cameras. Accordingly, embodiments of the present invention can utilize high-throughput cameras that can live-stream data at ~100 frames per second. Faster imaging up to 1,000 frames per second can be achieved for smaller fields of view.

Specialized cameras can record up to 1,000,000 frames per second for 2-3 seconds, typically limited by the size of the internal storage unit. Such cameras are also now available with integrated polarizers and can be utilized to enable high-speed imaging of high-birefringence samples.

Moreover, in some embodiments, fixed or programmable polarization modulators are utilized in conjunction with the optical elements illustrated in FIG. 3A. Referring to FIG. 3A, optional fixed polarization modulators 302 are illustrated, although they could also be programmable polarization modulators. Furthermore, although images for polarization states $I_0°$, $I_{45}°$, $I_{90}°$, and $I_{135}°$ are illustrated in FIG. 3A, this is not required by the present invention and a full Stokes polarimeter can be implemented. In this implementation, a first image can be obtained using light having a circular polarization state, a second image can be obtained using light having an elliptical polarization state aligned with 0°, a third image can be obtained using light having an elliptical polarization state aligned with 60° and a fourth image can be obtained using light having an elliptical polarization state aligned with 120°.

FIG. 3B is a simplified schematic diagram 300b illustrating the use of a single polarization-sensitive camera to perform polarization-resolved imaging according to an embodiment of the present invention. In this embodiment, a single camera is used to achieve simultaneous detection of multiple polarization channels. Light in all four polarization states 356 is incident on lens 352 that focuses light onto polarization-resolved camera 350. In order to obtain images for light in each of the four linearly polarized states, each pixel set includes four polarization-resolved pixels with wire-grid polarizers oriented at 0°, 45°, 90°, and 135° that are integrated in front of the pixels as illustrated by the pixel format shown in FIG. 3B. Thus, each pixel of polarization-resolved camera 350 has a polarizer (e.g., a nanowire polarizer grid) associated with the pixel. As an example, the BFS-U3-51S5P-C camera, available from FLIR® Systems, Inc., can be utilized as polarization-resolved camera 350.

Although the extinction ratio of some polarization-resolved camera (e.g., <500:1) is lower than that achievable in the imaging system described in relation to FIG. 3A (up to and exceeding 4,000:1), the polarization-resolved camera illustrated in FIG. 3B can be suitable for imaging samples with high birefringence.

Figure 3C:
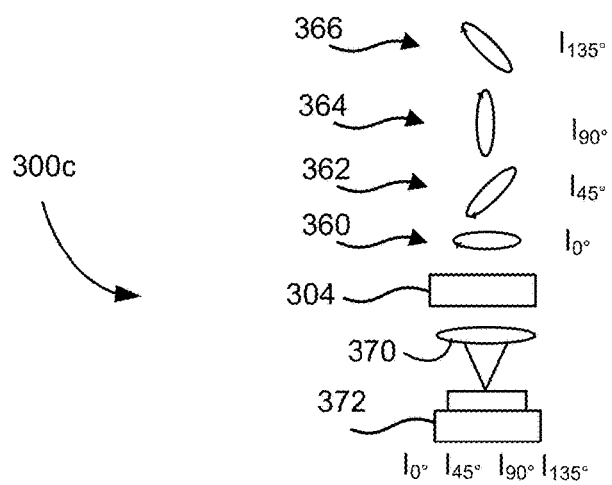
FIG. 3C is a simplified schematic diagram illustrating the use of a single camera to perform sequential image polarization-resolved imaging according to an embodiment of the present invention.

FIG. 3C is a simplified schematic diagram 300c illustrating the use of a single camera to perform sequential polarization-resolved imaging according to an embodiment of the present invention. As illustrated in FIG. 3C, polarization states aligned with different directions are imaged sequentially. As an example, light in a first polarization state 360 (e.g., light aligned with a direction of 0°) is incident on lens 370 that focuses light onto camera 372. Accordingly, an image (i.e., $I_0°$) characterizing the intensity of light having the first polarization state is detected. Subsequently, light in a second polarization state 362 (e.g., light aligned with a direction of 45°) is incident on lens 370 that focuses light onto camera 372. Accordingly, an image characterizing the intensity of the light having the second polarization state (i.e., $I_{45}°$) is detected using camera 372. Light in a third polarization state 364 (e.g., light aligned with a direction of 90°) is incident on lens 370 that focuses light onto camera 372. Accordingly, an image characterizing the intensity of the light having the third polarization state (i.e., $I_{90}°$) is detected using camera 372. Light in a fourth polarization state 366 (e.g., light aligned with a direction of 135°) is incident on lens 370 that focuses light onto camera 372. Accordingly, an image characterizing the intensity of the light having the fourth polarization state (i.e., $I_{135}°$) is detected using camera 372.

As discussed above in relation to FIG. 3A, Moreover, a programmable polarization modulator can be utilized in conjunction with the optical elements illustrated in FIG. 3C, illustrated as optional programmable polarization modulator 304, which is also referred to as a universal polarizer. Programmable polarization modulator 304 is able to sequentially pass a predetermined polarization, for example, polarization states $I_0°$, $I_{45}°$, $I_{90}°$, and $I_{135}°$ so that these polarization states can be detected using camera 372. Although the four polarization states $I_0°$, $I_{45}°$, $I_{90}°$, and $I_{135}°$ are illustrated in FIG. 3C, embodiments of the present invention can utilize other polarization states, including a first image obtained using light having a circular polarization state, a second image obtained using light having an elliptical polarization state aligned with 0°, a third image obtained using light having an elliptical polarization state aligned with 60°, and a fourth image obtained using light having an elliptical polarization state aligned with 120°.

Thus, embodiments of the present invention can utilize a variety of imaging systems, including multiple cameras, each associated with a different polarization state, a single camera with pixel sets that includes four polarization-resolved pixels, and a single camera that obtains images of light in different polarization states sequentially. One of ordinary skill in the art would recognize many variations, modifications, and alternatives.

Having discussed several exemplary illumination and detection implementations, the following description relates to a forward model of 3D density, anisotropy, and orientation imaging that is utilized according to embodiments of the present invention. Herein, 3D spatio-angular measurements are utilized to form 3D images. The following nomenclature is utilized:

The word '3D' without qualification and the word 'volume' imply XYZ spatial dimensions.

The words 'anisotropy' and '3D orientation' imply 3D angular measurements in spherical coordinates.

The symbol $\vec{\blacksquare}$ is used to indicate vector quantities that have magnitude and direction, and $\bar{\blacksquare}$ is used to indicate tensors.

Figure 4A:
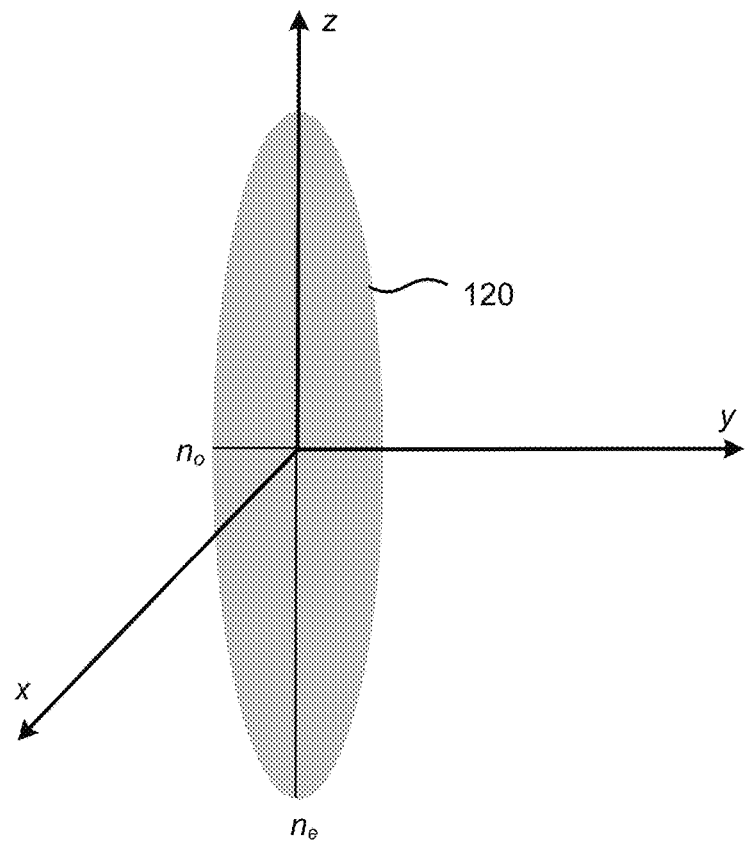
FIGS. 4A and 4B are schematics illustrating relative permittivity of materials under a defined coordinate system for description of anisotropy and 3D orientation.
Figure 4B:
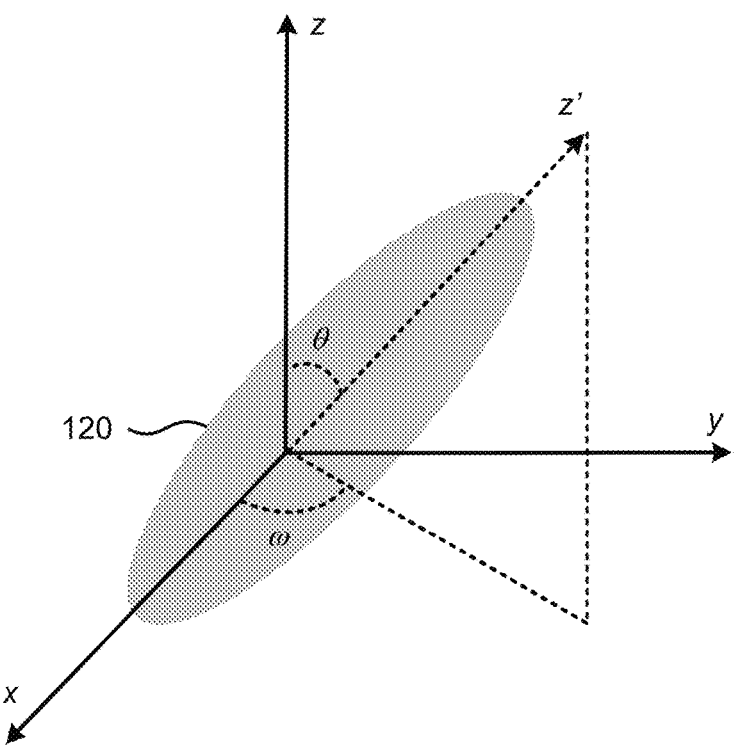

FIGS. 4A and 4B are schematics illustrating relative permittivity of materials under a defined coordinate system for description of anisotropy and 3D orientation. As described more fully below, density, anisotropy, and 3D orientation can be obtained from a permittivity tensor. The 3D distribution of the density and anisotropy of a specimen arise from the 3D distribution of the material's relative permittivity. An anisotropic material has multiple permittivity constants that change as a function of the angle between the direction of the applied electric field and the orientation of the optic axis of the material. This permittivity can be expressed as a tensor.

Referring to FIGS. 4A and 4B, FIG. 4A illustrates a positively uniaxial material oriented along the z axis and FIG. 4B illustrates a positively uniaxial material oriented along the z' axis. The coordinate system illustrated in FIGS. 1A and 1B is also utilized in FIGS. 4A and 4B. The material is represented as a 3D ellipsoid whose two radii are equal to the ordinary refractive index ($n_o$) and the third radius is equal to the extraordinary refractive index ($n_e$). Positive uniaxial material or material of positive anisotropy exhibits higher refractive index ($n_e > n_o$) along the axis of symmetry. Negative uniaxial material exhibits lower refractive index ($n_e < n_o$) along the axis of symmetry. Using this formalism, it is possible to represent 3D density, 3D anisotropy, and 3D orientation with the components of the permittivity tensor.

Embodiments of the present invention utilize a method, which can be referred to as a forward model, to relate the specimen's physical properties of 3D density and anisotropy to measured intensities. The deconvolution algorithm leverages this forward model to retrieve the specimen's physical properties.

Figure 6:
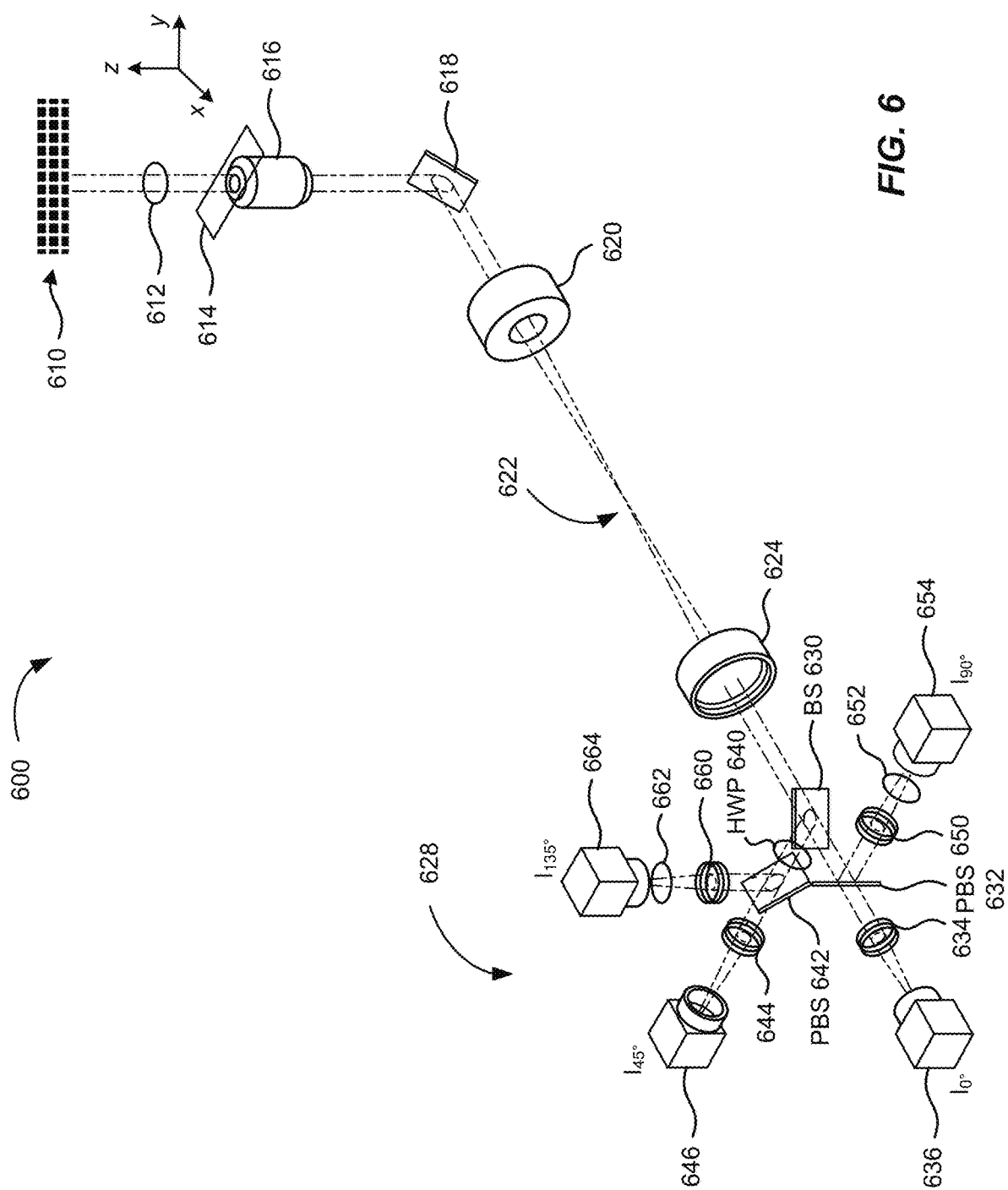
FIG. 6 is a simplified schematic diagram illustrating a multi-camera polarization-resolved imaging system according to an embodiment of the present invention.

We assume that the imaging system's optical axis is aligned along the z-axis as shown in FIG. 1A and FIG. 6. Considering an uniaxial material oriented in the z direction as shown in FIG. 4A, we can write its permittivity tensor as:

$$\bar{\bar{\epsilon}}_r = \begin{bmatrix} n_o^2 & 0 & 0 \\ 0 & n_o^2 & 0 \\ 0 & 0 & n_e^2 \end{bmatrix} = \begin{bmatrix} \epsilon_r - \Delta\epsilon_r & 0 & 0 \\ 0 & \epsilon_r - \Delta\epsilon_r & 0 \\ 0 & 0 & \epsilon_r + \Delta\epsilon_r \end{bmatrix}, \quad (1)$$

where $n_o$ and $n_e$ are refractive indices experienced by the ordinary and extraordinary wave, respectively. The 3D spatial distribution of $n_o$ and $n_e^2$ are related to the permittivity. We express the anisotropic permittivity in terms of two moments of the angular distribution of the permittivity: average permittivity ($E_r$) and angular deviation in permittivity ($\Delta\epsilon_r$). They are related to refractive indices as follows:

$$\epsilon_r = \tfrac{1}{2}(n_e^2 + n_o^2) \Delta\epsilon = \tfrac{1}{2}(n_e^2 - n_o^2) \quad (3)$$

When the material is oriented along the z' direction with in-plane (i.e., x-y plane) orientation of $\omega$ and inclination of $\theta$ as shown in FIG. 4B, the permittivity tensor in the microscope's frame of reference is obtained through applying a rotational transformation on $\epsilon\epsilon_r$ and is expressed as $$\bar{\bar{\epsilon}}_{r,\theta,\omega} = \begin{bmatrix} \epsilon_r - \Delta\epsilon_r(\cos^2\theta - \sin^2\theta\cos 2\omega) & \Delta\epsilon_r\sin^2\theta\sin 2\omega & \Delta\epsilon_r\sin 2\theta\cos 2\omega \\ \Delta\epsilon_r\sin^2\theta\cos 2\omega & \epsilon_r - \Delta\epsilon_r(\cos^2\theta - \sin^2\theta\cos 2\omega) & \Delta\epsilon_r\sin 2\theta\sin\omega \\ \Delta\epsilon_r\sin 2\theta\cos 2\omega & \Delta\epsilon_r\sin 2\theta\sin\omega & \epsilon_r + \Delta\epsilon_r\sin 2\theta \end{bmatrix}. \quad (2)$$

The methods described herein measure entries of the permittivity tensor at every voxel of the volume to accomplish 3D imaging of absorption (~Im{$\epsilon\epsilon_r$}), density (~Re{$\epsilon_r$}), anisotropy ($\Delta\epsilon_r$), and 3D orientation ($\theta$ and $\omega$). In the subsequent analysis, we assume that the specimen can absorb light, but does not exhibit diattenuation. These two assumptions translate into assumptions that absorption (~Im{$\epsilon_r$}) is significant, but $\Delta\epsilon_r$ does not have an imaginary component.

Embodiments of the present invention enable measurements of optical properties of samples, for example, tissues, at multiple scales. Computing physically meaningful measurements of density, retardance, 3D orientation, and optic sign at lower spatial scales utilizes a specific filtering approach included within embodiments of the present invention. The reconstruction steps that lead to components of the permittivity tensor as described herein are mostly linear. However, computation of optical properties from the permittivity tensor components involves non-linear operations. Therefore, according to embodiments of the present invention, the low-resolution measurements are computed by linear filtering of the high-resolution volumes of the scattering potential tensor, which are then transformed into phase, retardance, and 3D orientation. This approach ensures that the computed optical properties at lower resolution are representative of an acquisition with a light path of lower spatial resolution.

Accordingly, embodiments of the present invention can utilize statistical analysis of physical properties in two different ways: reconstruction of physical properties that relies on statistics (e.g., mean and standard deviation) in the permittivity tensor space, whereas interpretation of physical properties that relies on statistics of phase, retardance, 3D orientation, and optic sign.

Next, we described a linearized model of Stokes parameters of light in terms of permittivity tensor and illumination pattern.

In this analysis, the Stokes parameters are utilized to represent the polarization state of light, since the Stokes parameters provide a complete description of the state of light and provide multiple experimental advantages. The measurement methods described herein recover the Stokes parameters across the imaging volume with high accuracy and sensitivity, from which volumetric distributions of the terms of the permittivity tensor are estimated. To estimate the permittivity tensor from the Stokes parameters, the inventors have developed a linearized model that relates the volumetric distribution of the Stokes parameters with the volumetric distribution of the terms of the permittivity tensor. This linearized model is then utilized with the forward model to develop a corresponding inverse algorithm that retrieves the terms of permittivity tensor across the imaging volume.

Considering the generalized wave equation in an anisotropic media, $$\nabla \times \nabla \times \vec{E}(\vec{r}) = k_0^2 \epsilon_r(\vec{r})\vec{E}(\vec{r}), \quad (4)$$

where, $\vec{E}(\vec{r}) = [E_x(\vec{r}), E_y(\vec{r}), E_z(\vec{r})]^T$ is the electric field in 3D space $\vec{r} = [x, y, z]^T$, $k_0 = 2\pi/\lambda$ is the free-space wavenumber, and $\lambda$ is the wavelength of the light. Reformulating this wave equation into $$\nabla \times \nabla \times \vec{E}(\vec{r}) - k_0^2 \epsilon_{rm}\vec{E}(\vec{r}) = k_0^2(\epsilon_r(\vec{r}) - \epsilon_{rm})$$
$$E(\vec{r}) = -\vec{f}(\vec{r})\vec{E}(\vec{r}), \quad (5)$$

where $\epsilon_{rm}$ is the isotropic relative permittivity constant of the surrounding media and is a scalar value. $\vec{f}(\vec{r})$ is the scattering potential tensor.

The same wave equation can be rewritten in the integral form as:

$$\vec{E}(\vec{r}) = \vec{E}_{in}(\vec{r}) - \int \vec{G}(\vec{r} - \vec{r}')f(\vec{r}')\vec{E}(\vec{r}')d^3\vec{r}', \quad (6)$$

where $\epsilon_{in}(\vec{r})$ is the homogeneous solution of Eq. (5), which corresponds to the incident electric field, and $$\bar{\bar{G}}(\vec{r}) = \begin{bmatrix} G_{xx}(\vec{r}) & G_{xy}(\vec{r}) & G_{xz}(\vec{r}) \\ G_{yx}(\vec{r}) & G_{yy}(\vec{r}) & G_{yz}(\vec{r}) \\ G_{zx}(\vec{r}) & G_{zy}(\vec{r}) & G_{zz}(\vec{r}) \end{bmatrix} \quad (7)$$

is the free-space dyadic Green's function. Assuming the specimen is weakly scattering, we apply the Born approximation to Eq. (6), and we relate the scattered electric field to the permittivity tensor under a coherent incident field as:

$$\vec{E}(\vec{r}) = \vec{E}_{in}(\vec{r}) - \int \bar{\bar{G}}(\vec{r}-\vec{r}\,')\bar{\bar{f}}(\vec{r}\,')\vec{E}_{in}(\vec{r}\,')d^3\vec{r}\,'. \quad (8)$$

Eq. (8) provides a mapping between the coherent scattered field and the permittivity tensor.

Next, the model is extended to compute generalized Stokes parameters of light when a given pattern of illumination interacts with the permittivity tensor of the specimen. In general, the illumination produced by a programmable light source (LED array or LCD panel) is partially coherent, i.e., it is a statistical sum of multiple coherent modes. Generalized Stokes parameters relate the statistical sum of electric field products from multiple coherent modes with intensities recorded by the polarization-resolved detector. Thus, the model is able to map the measured Stokes parameters under partially coherent illumination to the permittivity tensor. Each coherent scattered mode is obtained through Eq. (8) with the incident field of $$\vec{E}_{in,\vec{v}_i}(\vec{r}) = \begin{bmatrix} \vec{E}_{in,x,\vec{v}_i} \\ \vec{E}_{in,y,\vec{v}_i} \\ \vec{E}_{in,z,\vec{v}_i} \end{bmatrix} \cdot e^{i2\pi\vec{v}_i\cdot\vec{r}}, \quad (9)$$

where $E_{in,x,vi}$, $E_{in,yci}$, and $E_{in,zvi}$ are electric field components of a plane wave in the specimen plane obtained from the electric field components ($E_{s,x}$ and $E_{s,y}$) of a source point in the front aperture plane of the condenser lens $$E_{in,x,\vec{v}_i} = \frac{1}{v_{i,x}^2 + v_{i,y}^2} \left[ E_{s,x} \cdot \left( v_{i,x}^2 \sqrt{1-\lambda^2(v_{i,x}^2 + v_{i,y}^2)} + v_{i,y}^2 \right) + \right. \quad (9a)$$
$$\left. E_{s,y} \cdot v_{i,x}v_{i,y}\left(\sqrt{1-\lambda^2(v_{i,x}^2 + v_{i,y}^2)} - 1\right) \right]$$

$$E_{in,y,\vec{v}_i} = \frac{1}{v_{i,x}^2 + v_{i,y}^2} \left[ E_{s,x} \cdot v_{i,x}v_{i,y}\left(\sqrt{1-\lambda^2(v_{i,x}^2 + v_{i,y}^2)} - 1\right) + \right. \quad (9b)$$
$$\left. E_{x,y} \cdot \left( v_{i,x}^2 \sqrt{1-\lambda^2(v_{i,x}^2 + v_{i,y}^2)} + v_{i,y}^2 \right) \right]$$

$$E_{in,z,\vec{v}_i} = -[E_{s,x}\cdot\lambda v_{i,x} + E_{s,y}\cdot\lambda v_{i,y}] \quad (9c)$$

The calibrated electric field components discussed in relation to FIG. 5 are $E_{s,x}$ and $E_{s,y}$. They are plugged into Eq. (9a-9c) to generate $E_{in,x,vi}$, $E_{iny,vi}$, and $E_{in,z,vi}$, which are in turn used in the following reconstruction. Every illumination pattern $\alpha$ is described by points $v_{i,x}$, $v_{i,y}$ in the aperture plane, where $\vec{v}_i$ denotes the spatial frequency of a single incident field from the i-th partially coherent source pattern. Different partially coherent source patterns ($\alpha$) are specified by different sets of $\vec{v}_i$. By summing up the contribution of all the coherent scattered modes from one illumination pattern, we obtain the Stokes parameters as $$\begin{bmatrix} S_{0,i}(\vec{r}) \\ S_{1,i}(\vec{r}) \\ S_{2,i}(\vec{r}) \\ S_{3,i}(\vec{r}) \end{bmatrix} = \begin{bmatrix} \sum_{\vec{v}_i} |E_{x,\vec{v}_i}(\vec{r})|^2 + |E_{y,\vec{v}_i}(\vec{r})|^2 \\ \sum_{\vec{v}_i} |E_{x,\vec{v}_i}(\vec{r})|^2 - |E_{y,\vec{v}_i}(\vec{r})|^2 \\ \sum_{\vec{v}_i} E_{x,\vec{v}_i}(\vec{r})E^*_{y,\vec{v}_i}(\vec{r}) + E^*_{x,\vec{v}_i}(\vec{r})E^*_{y,\vec{v}_i}(\vec{r}) \\ i\sum_{\vec{v}_i} E_{x,\vec{v}_i}(\vec{r})E^*_{y,\vec{v}_i}(\vec{r}) - E^*_{x,\vec{v}_i}(\vec{r})E^*_{y,\vec{v}_i}(\vec{r}) \end{bmatrix} \quad (10)$$

As noted in [0052], a polarization state analyzer on the detection side can be a complete polarimeter that measures all four Stokes parameters of the light or it can be a linear polarimeter that measures the first three Stokes parameters of light.

Plugging Eq. (8) in Eq. (10) for each coherent mode, it can be observed that the Stokes parameters are nonlinearly related to entries of the permittivity tensor. Assuming the strongest contribution to Eq. (10) comes from the linear terms of the permittivity tensor, the Stokes parameters are linearly related to seven real-valued non-linear functions ($f_0, f_6$) of the permittivity tensor:

$$f_0(\vec{r}) = \text{RE}\{k_0^2[\epsilon_{rm}-\epsilon_r(\vec{r})+\Delta\epsilon_r(\vec{r})\cos^2\theta(\vec{r})]\},$$
$$f_1(\vec{r}) = \text{Im}\{k_0^2[\epsilon_{rm}-\epsilon_r(\vec{r})+\Delta\epsilon_r(\vec{r})$$
$$\cos^2\theta(\vec{r})]\}, f_2(\vec{r}) = -k_0^2\Delta\epsilon_r(\vec{r})\sin^2\theta(\vec{r})$$
$$\cos^2\omega(\vec{r}), f_3(\vec{r}) = -k_0^2\Delta\epsilon_r(\vec{r})\sin^2\theta(\vec{r})$$
$$\sin^2\omega(\vec{r}), f_4(\vec{r}) = -k_0^2\Delta\epsilon_r(\vec{r})\sin\theta(\vec{r})$$
$$\cos\omega(\vec{r}), f_5(\vec{r}) = -k_0^2\Delta\epsilon_r(\vec{r})\sin^2\theta(\vec{r})$$
$$\sin\omega(\vec{r}), f_6(\vec{r}) = -k_0^2\Delta\epsilon_r(\vec{r})[\sin^2\theta(\vec{r})-2\cos^2\theta(\vec{r})]. \quad (11)$$

The linear relationship is explicitly expressed as $$\tilde{S}_{m,i}(\vec{u}) = \Sigma H_{m,\ell,i}(\vec{u}) \cdot \tilde{f}_\ell(\vec{u}), \quad (12)$$

where $\tilde{\ }$ denotes the Fourier transform of the quantity, $\vec{u}$ is the coordinate of the spatial frequency, and $H_{m,\ell,i}(\vec{\mu})$ are the transfer functions mapping from entries of the permittivity tensor to the m-th Stokes parameter under the i-th illumination patterns.

Utilizing a detector that employs only linear states of polarization, for examples, the single camera design illustrated in FIG. 3B, sensitivity to the Stokes parameters $S_0$, $S_1$, $S_2$ is enabled, but not to the Stokes parameter $S_3$ that reports handedness of the circular component. In embodiments that utilize a sequential detector as discussed in relation to FIG. 3C, it is possible to measure the fourth Stokes parameter $S_3$, which enables reconstruction of additional information, including depolarization and diattenuation. Depolarization by the specimen reduces the degree of polarization of incident illumination, whereas diattenuation can increase the degree of polarization of the incident illumination. As described next, asymmetric illumination when combined with linear Stokes polarimeter and accurate diffraction model can measure density, absorption, linear birefringence, 3D orientation of linear birefringence, and the sign of optic axis. These material properties are captured by the permittivity tensor shown in Eq (2). Asymmetric illumination combined with a full Stokes polarimeter can also be extended to measure more complex permittivity tensor that describe other material properties, such as optical activity (circular birefringence), linear dichroism, and circular dichroism.

The inverse model of 3D density and anisotropy imaging is described next.

The inverse algorithm based on the previous forward model takes the Stokes parameters from each illumination pattern, $\tilde{S}_{m,i}(\vec{\mu})$, as inputs to estimate the entries of the permittivity tensor in 3D space. Rigorously, this inverse problem can be formulated as $$\min_{f_\ell(\vec{u})} \left\| \sum_{m,i} \tilde{S}_{m,i}(\vec{u}) - \Sigma H_{m,\ell,i}(\vec{u}) \cdot \tilde{f}_\ell(\vec{u}) \right\|_2^2 + \sum_\ell \tau_\ell \left\| \tilde{f}_\ell(\vec{u}) \right\|_2^2, \quad (13)$$

where $\tau_\ell$ is the Tikhonov regularization parameters for each independent term in the permittivity tensor. The solutions ($\tilde{f}_\ell(\vec{\mu})$), of this optimization problem can be provided by a least square solution for the proposed inverse problem. With this solution, $f_0(\vec{r})$ is determined as the real part of the average refractive index from $n_e$ and $n_o$, representing the optical path length of the material, while $f_1(\vec{r})$ is the imaginary part of the average refractive index, representing the optical absorption of the material.

The axially accumulated phase (density) and absorption per voxel is approximately related to $f_0(\vec{r})$ and $f_1(\vec{r})$ with the following scaling $$\varphi(\vec{r}) \approx -\frac{\Delta z}{2k_0 \sqrt{\epsilon_{rm}}} \cdot f_0(\vec{r}) \quad (14)$$

$$\mu(\vec{r}) \approx \frac{\Delta z}{2k_0 \sqrt{\epsilon_{rm}}} \cdot f_1(\vec{r})$$

where $\Delta z$ is the sampling size in the axial direction.

From $f_2(\vec{r})$, $f_3(\vec{r})$, $f_4(\vec{r})$, and $f_5(\vec{r})$, it is possible to extract the principal retardance, $\rho(\vec{r})$, and the 3D orientation, $\theta(\vec{r})$, $\omega(\vec{r})$, with the following algebra:

$$\omega(\vec{r}) = \begin{cases} \frac{1}{2}\tan^{-1}\left[\frac{-f_3(\vec{r})}{-f_2(\vec{r})}\right], & \text{when } n_e > n_o \\ \frac{1}{2}\tan^{-1}\left[\frac{f_3(\vec{r})}{f_2(\vec{r})}\right], & \text{when } n_e < n_o \end{cases} \quad (15)$$

$$\theta(\vec{r}) = \begin{cases} \tan^{-1}\left[\frac{-2f_2(\vec{r})\cdot\cos 2\omega(\vec{r}) - 2f_3(\vec{r})\cdot\sin 2\omega(\vec{r})}{-f_4(\vec{r})\cdot\cos\omega(\vec{r}) - f_5(\vec{r})\cdot\sin\omega(\vec{r})}\right], \\ \qquad \text{when } n_e > n_o \\ \tan^{-1}\left[\frac{2f_2(\vec{r})\cdot\cos 2\omega(\vec{r}) + 2f_3(\vec{r})\cdot\sin 2\omega(\vec{r})}{f_4(\vec{r})\cdot\cos\omega(\vec{r}) + f_5(\vec{r})\cdot\sin\omega(\vec{r})}\right], \\ \qquad \text{when } n_e < n_o \end{cases}$$

$$\rho(\vec{r}) = \frac{\left[-f_2(\vec{r})\cdot\cos 2\omega(\vec{r}) - f_3(\vec{r})\cdot\sin 2\omega(\vec{r})\right]\cdot\sin^2\theta(\vec{r})\cdot\Delta z}{k_0\sqrt{\epsilon_{rm}}\cdot\left(\sin^4\theta(\vec{r}) + \sigma\right)},$$

where $\sigma$ is a small number to prevent noise amplification. Thus, embodiments of the present invention provide 3D imaging of density, anisotropy, and orientation.

As described herein, $f_0(\vec{r})$ and $f_1(\vec{r})$ are related to the difference of average permittivity between the specimen and the environment, which corresponds to accumulated optical phase and absorption information. If the effect of phase and absorption is much stronger than the effect of optical anisotropy, $f_0(\vec{r})$ and $f_1(\vec{r})$ are roughly proportional to the phase and the absorption. If the permittivity of the environment is close to the average permittivity of the specimen, the phase and absorption are approximately related to $f_0(\vec{r})$ with the following scaling:

$$\phi(\vec{r}) \approx -\frac{\Delta z}{2k_0\sqrt{\epsilon_{rm}}} \cdot f_0(\vec{r}) \quad (16)$$

$$\mu(\vec{r}) \approx \frac{\Delta z}{2k_0\sqrt{\epsilon_{rm}}} \cdot f_1(\vec{r}),$$

where $\varphi(\vec{r})$ and $\mu(\vec{r})$ are phase and absorption of the specimen and $\Delta z$ is the sampling size of the data in the axial direction. Estimating principal retardance and 3D orientation from four terms in the scattering potential tensor, $f_2(\vec{r})$, $f_3(\vec{r})$, $f_4(\vec{r})$, $f_5(\vec{r})$, utilizes information of the optic sign ($n_e > n_o$ or $n_o > n_e$). Accordingly, some embodiments of the present invention provide two sets of analytical solution for principal retardance and 3D orientation under assumptions of two optic signs. These two sets of solution are then used to estimate the probability of the optic signs in later computations. Using trigonometry relations, the two solutions of the principal retardance and 3D orientation can be expressed as $$\omega_\pm(\vec{r}) = \frac{1}{2}\tan^{-1}\left[\frac{\mp f_3(\vec{r})}{\mp f_2(\vec{r})}\right], \text{ when } n_e \gtrless n_o \quad (17)$$

$$\theta_\pm(\vec{r}) = \tan^{-1}\left\{\frac{\mp 2\left[f_3(\vec{r})\cdot\sin 2\omega_\pm(\vec{r}) + f_2(\vec{r})\cdot\cos 2\omega_\pm(\vec{r})\right]}{\mp\left[f_5(\vec{r})\cdot\sin\omega_\pm(\vec{r}) + f_4(\vec{r})\cdot\cos\omega_\pm(\vec{r})\right]}\right\},$$

when $n_e \gtrless n_o$ $$\rho_\pm(\vec{r}) =$$

$$\frac{k_0\Delta z}{\sqrt{\epsilon_{rm}}}\cdot\Delta\epsilon_r(\vec{r}) = \frac{\left[f_3(\vec{r})\cdot\sin 2\omega_\pm(\vec{r}) + f_2(\vec{r})\cdot\cos 2\omega_\pm(\vec{r})\right]\cdot\sin^2\theta_\pm(\vec{r})\cdot\Delta z}{k_0\sqrt{\epsilon_{rm}}\cdot\left[\sin^4\theta_\pm(\vec{r}) + \sigma\right]},$$

where $\omega_+$, $\theta_+$, and $\rho_+$ are in-plane orientation, out-of-plane inclination, and principal retardance of the positive or negative uniaxial material. $\sigma$ is a small number to prevent noise amplification in the estimation of principal retardance. Typically, $\sigma = 10^{-2} \sim 10^{-3}$ is a good choice to balance between accuracy and noise amplification.

At the end of this computation, the range of the azimuth is $\omega \star [0,\pi)$ and of the inclination is $\theta \in [0,\pi)$. These ranges correspond to the front half of the hemisphere of unit sphere ($y \geq 0$). For intuitive visualization of 3D orientation, it is possible to transform $(\omega, \theta)$ coordinates to span the range of the top hemisphere (i.e., $z > 0$) by reflecting the 3D orientations around the origin.

The optic sign of the anisotropy reports symmetry of the underlying structure. Given the type of the material imaged, it is possible to pick one set of solutions from $\omega_+$, $\theta_+$, and $\rho_+$. More often, the optic sign of a biological structure is not known and can be spatially variable.

For cases where the optic sign is unknown, embodiments of the present invention utilize an algorithm that models the scattering potential as a mixture of positive uniaxial and negative uniaxial material. The algorithm starts with constructing the scattering potential tensor components with positive ($\omega_+$, $\theta_+$, and $\rho_+$) and negative ($\omega_-$, $\theta_-$, and $\rho_-$) set of solution. Then, the set of solution that is more favorable given the data is determined by solving the following optimization problem:

$$\min_{w_+(\vec{r}), w_-(\vec{r})} \sum_\alpha \sum_{m=0}^2 \left\| \tilde{S}_{m,\alpha}(\vec{u}) - \sum \tilde{H}_{m,\ell}(\vec{u}) \mathcal{F}\left\{ w_+(\vec{r}) \cdot f_{\ell,+}(\vec{r}) + w_-(\vec{r}) \cdot f_{\ell,-}(\vec{r}) \right\} \right\|_2^2, \quad (18)$$

where $w_+(\vec{r})$ and $w_-(\vec{r})$ are the weights for positive and negative uniaxial solutions (e.g., only considering positive values of the weight). When the positive material is more favorable (the structure within a voxel is denser along axis of symmetry), $w_+(\vec{r})$ is larger than $w_-(\vec{r})$ On the other hand, $w_-(\vec{r})$ is larger than $w_+(\vec{r})$ when negative material is more favorable (i.e., the structure is denser perpendicular to the symmetry axis). When the material is isotropic, $w_+(\vec{r})\_(\vec{r})$. In some embodiments, a gradient descent iterative algorithm is utilized to solve this optimization. To identify material type with these two weights, the probability of the specimen being positive material is defined to be:

$$p_+(\vec{r}) = \frac{\max\left[\frac{w_+(\vec{r})}{|w_+(\vec{r})| + |w_-(\vec{r})|}, w_c\right]}{\max\left[\frac{w_+(\vec{r})}{|w_+(\vec{r})| + |w_-(\vec{r})|}, w_c\right] + \max\left[\frac{w_-(\vec{r})}{|w_+(\vec{r})| + |w_-(\vec{r})|}, w_c\right]}, \quad (19)$$

where $w_c$ is a cut-off weight to threshold out noisy weight estimates for smooth probability reconstruction. $w_c$ is usually set to be around 0.05-0.2, with the higher the value, the stronger the thresholding effect.

Accordingly, rather than assuming the optic sign, estimates of the optic sign can be utilized to form two reconstructions (i.e., two sets of solution) and the reconstructions compared to measured Stokes parameters to determine the optic sign. As illustrated in the optimization, each solution is weighted using a weight coefficient and the weight coefficients are optimized to determine which set of solution more closely matches the measured Stokes parameters, i.e., the error between the Stokes volumes and the superposition of the weighted positive and negative uniaxial material parameters is minimized. Given the weights computed during the optimization, the probability of the specimen being positive material is then computed using the weights and the probability is used to determine the material type.

As described herein, embodiments of the present invention convert the intensity modulation from the density and anisotropy of the specimens into physical properties. These intensity modulations are built upon a constant intensity background that defines the transmission of the surrounding media. The ratio between the strength of the intensity modulation and the shot noise created by the constant background intensity defines the signal to noise ratio (SNR) of the measurements. Biological specimens generally have strong phase (i.e., average refractive index) and relatively weak anisotropy. Hence, it is common that SNR issues are associated with anisotropy measurements. As described below, embodiments of the present invention utilize one or both of two approaches to improve the SNR of measurements.

The first approach is to bring down the shot noise in the raw intensity through averaging multiple frames, which can be referred to as image averaging. Since the strength of anisotropy from a biological specimen is fixed, embodiments of the present invention can average the raw intensity by $N_{avg}$ frames to improve the SNR by a factor of $\sqrt{N_{avg}}$. $N_{avg}$ varies based on the particular imaging project. For strongly anisotropic structures, such as the anisotropic glass target discussed in relation to FIGS. 7A-7G, averaging may not be needed and Navg=1 may be sufficient to obtain desired results. For weaker anisotropic structures such as iPSC-derived cardiomyocytes, some embodiments will average 32 frames, 100 frames, or the like, per intensity acquisition, to increase the SNR.

The second approach is to apply an additional wavelet denoising on the principal retardance after the deconvolution algorithm has been utilized. A Tikhonov regularizer in the existing deconvolution algorithm prevents the reconstructed physical properties from experiencing over-amplification of the noise. Total-variation or wavelet-based denoising algorithms that leverage the continuity of the images can be used to provide additional improvements in the SNR of the image. However, according to some embodiments, a proper implementation of these algorithms with the deconvolution utilizes an iterative approach to solve the optimization problem, further increasing the currently heavy computation load. Accordingly, some embodiments adopt a hybrid solution of directly performing a wavelet denoising algorithm on the principal retardance images in order to balance the benefits of SNR improvements against the computational load. The denoising algorithm can be a single step soft-thresholding operation in the wavelet space on the images. This operation produces a solution of the following the optimization formalism:

$$\min_x \frac{1}{2} \|\hat{x} - x\|_2^2 + \tau_w \|Wx\|_1, \quad (20)$$

where $\hat{x}$ is the input image, $\tau_w$ is the wavelet regularization parameter, and $W$ is the operator of the wavelet transform. The solution of this optimization problem is analytical and is expressed as $$x_{sol} = W^{-1} T_{\tau_w}(X\hat{x}), \quad (21)$$

$$\text{where } [T_{\tau_w}(a)]_i = \begin{cases} 0, & |a_i| \le \tau_w \\ \frac{|a_i| - \tau_w}{|a_i|} \cdot a_i, & |a_i| > \tau_w \end{cases}$$

To denoise the principal retardance images, $\tau_w$ is generally chosen to be 10% to 20% of the average signal level.

In addition to SNR issues associated with principal retardance measurements, edge retardance created at the edge of strong phase features can be strong enough to mask out important anisotropic features with low retardance. One of the major signatures of the edge retardance is that it shows double-edge retardance around the phase edge with perpendicular orientations between the two edges. For the retardance from a true anisotropic structure (i.e., not the edge retardance), the orientation of the retardance is usually more uniform across the structure. Accordingly, some embodiments of the present invention compute an orientation continuity map to emphasize features with more consistent orientation and reject features with fast-varying orientation in the field of view.

The orientation continuity map is computed through the following steps. First, the method synthesizes the scattering potential tensor components with constant retardance and filter these synthesized tensor components with uniform filters, $U(\vec{r})$, of kernel size $N_k$ to have the averaged scattering potential tensor components as $$\begin{cases} f_{2,avg}(\vec{r}) = \left[\sin^2\theta(\vec{r})\cos 2\omega(\vec{r})\right] \otimes U_{N_k}(\vec{r}) \\ f_{3,avg}(\vec{r}) = \left[\sin^2\theta(\vec{r})\sin 2\omega(\vec{r})\right] \otimes U_{N_k}(\vec{r}) \\ f_{4,avg}(\vec{r}) = \left[\sin 2\theta(\vec{r})\cos\omega(\vec{r})\right] \otimes U_{N_k}(\vec{r}) \\ f_{5,avg}(\vec{r}) = \left[\sin 2\theta(\vec{r})\sin\omega(\vec{r})\right] \otimes U_{N_k}(\vec{r}) \end{cases} \quad (22)$$

Second, the method uses these averaged scattering potential tensor components to compute the principal retardance as discussed above. The averaged principal retardance shows high values when the orientation is more continuous along spatial dimensions and small values when the orientation is varying pixel by pixel. The averaged retardance can then be normalized to the maximum value to define the orientation continuity map. Multiplying this map, effectively operating as a mask, with the original principal retardance from the measurements, signals from the edge retardance are reduced or eliminated, thereby improving the imaging performance for low-retardance structures. Accordingly, using this technique, pixels with smooth changes in orientation are preserved while pixels with rapid changes in orientation are suppressed to reduce the noise associated with these pixels with rapid changes in orientation.

Depending on the specimen being imaged, one or more of these averaging and denoising techniques can be utilized to improve the SNR. As an example, image averaging and/or wavelet denoising can be utilized generally. The orientation continuity technique can be utilized generally or for low SNR signals and/or for specimens that are known to be continuous in orientation. As an example, for brain tissue imaging, wavelet denoising can be used to improve the SNR. During imaging of cells, a combination of image averaging and wavelet denoising can be used. Moreover, during imaging of cardiomyocytes, image averaging, wavelet denoising, and the orientation continuity technique can be utilized for SNR improvement. Accordingly, the various SNR improvement techniques can be utilized individually or a combination of one or more of the various SNR improvement techniques can be utilized depending on the particular application.

FIG. 6 is a simplified schematic diagram illustrating a multi-camera polarization-resolved imaging system according to an embodiment of the present invention. As described more fully below, the optical system 600 illustrated in FIG. 6 can be utilized to perform imaging of a three dimensional specimen, for example, primary tissues and other in vivo samples.

Referring to FIG. 6, illumination source 610 is utilized to generate illumination light. As discussed in relation to FIGS. 1A and 1B, illumination source 610 and illumination mask 612 can be implemented as an LED array. Alternatively, illumination source 610 can be a uniform intensity light source used in conjunction with illumination mask 612 implemented in the form of an LCD panel. Holographic diffusers and other optical elements can be utilized to homogenize and spectrally filter the illumination light. As discussed in relation to FIGS. 2A-2D, illumination light from illumination source 610 can be generated in illumination patterns, with light propagating at various angles of illumination. In some embodiments, in addition to implementing angularly defined illumination patterns, illumination mask 612 may generate illumination light with a predetermined polarization state, for example, circular polarization. The light propagating at the various angles of illumination impinges on a specimen supported on specimen holder 614, also referred to as a sample stage. Light scattered as it passes through the specimen is collected by imaging optics 616, reflected off mirror 618, and directed toward lens 620, which may be a tube lens. Lens 620 serves to focus the scattered light at image plane 622, which typically serves as the camera port of the microscope.

In order to provide polarization channels, light propagating away from image plane 622 is collimated using lens 624 and directed to four-camera polarization-resolved imaging system 628. Lens 624 provides an aperture space in which the polarization optics are positioned. Although a four camera design utilizing four linearly-polarized detection paths is illustrated in FIG. 6, as discussed in relation to FIGS. 3B and 3C, other optical designs can be utilized to implement a polarization-resolved imaging system.

As illustrated in FIG. 6, four-camera polarization-resolved imaging system 628 includes beamsplitter 630, which is generally a 50/50 beamsplitter, for example, a silver sputtered non-polarizing 50/50 beamsplitter with substantially uniform transmission over a predetermined wavelength range (e.g., a broadband non-polarizing beamsplitter). Light incident on beamsplitter 630 is split into two optical paths: a first optical path directed toward polarizing beamsplitter 632 and a second optical path directed toward half waveplate 640 and polarizing beamsplitter 642.

Considering the first optical path directed from beamsplitter 630 toward polarizing beamsplitter 632, along this first path, the light transmitted through beamsplitter 630 impinges on polarizing beamsplitter 632, which splits the incident light into the 0° and 90° components. Light having a polarization aligned at 0° passes through polarizing beamsplitter 632 and is focused by lens 634 onto camera 636. In one embodiment, an ultra-flat wire-grid polarizing beam splitter, which provides high broadband contrast and low image distortion, is utilized. As illustrated in FIG. 6, each optical path includes a focusing lens so that the corresponding camera can form an image of the specimen positioned in the specimen plane of specimen holder 614. Thus, camera 636 captures an image of the specimen at 0° of polarization. In some embodiments, the focal length of lens 624 and lens 634 is the same, but this is not required by the present invention. Utilizing lenses with predetermined optical characteristics, Nyquist sampling of the specimen is achieved to achieve a predetermined spatial resolution.

Considering the second optical path directed from beamsplitter 630 toward half waveplate 640, the light reflected from beamsplitter 630 is rotated by −45° in polarization as it passes through half waveplate 640 and impinges on polarizing beamsplitter 642. As an example, a super-achromatic half waveplate can be utilized. Light having a polarization aligned at 45° is rotated by −45° after passing through half waveplate 640, is oriented along 0°, is transmitted through polarizing beamsplitter 642, and is focused by lens 644 onto camera 646. Thus, camera 646 captures an image of the specimen at 45° of polarization. Accordingly, the combination of a half waveplate and a polarizing beam splitter with a 0° transmission axis results in paths sensitive to 45° and, as described below, 135° polarization.

Returning again to the first optical path, light having a polarization aligned at 90°, after passing through beamsplitter 630, reflects from polarizing beamsplitter 632 along a third optical path and is focused by lens 650. In the optical paths that incorporate reflection from a polarizing beamsplitter, i.e., the third optical path and the fourth optical path, a clean-up polarizer is utilized to filter light reflected from the polarizing beamsplitter before the filtered light impinges on a camera. As will be evident to one of skill in the art, some broadband polarizing beamsplitters, for example, based on wire grid or nano-grid polarizers, provide higher extinction in transmission (i.e., transmission of the p-polarized state) than in reflection (i.e., reflection of the s-polarized state). Thus, the purity of the transmitted p-polarized state (i.e., the ratio of p-polarized light to s-polarized light transmitted by the polarizing beamsplitter) can be higher than the purity of the reflected s-polarized state (i.e., the ratio of s-polarized light to p-polarized light reflected by the polarizing beamsplitter). Accordingly, embodiments of the present invention utilize clean up polarizers to increase the purity of the reflected s-polarized state. Referring to FIG. 6, clean up polarizer 652 is utilized to filter light reflected from polarizing beamsplitter 632 along a third optical path before the filtered light impinges on camera 654. Thus, camera 654 captures an image of the specimen at 90° polarization.

Returning again to the second optical path, light having a polarization aligned at 135° is rotated by −45° by half waveplate 640, reflects from polarizing beamsplitter 642 along a fourth optical path and is focused by lens 660. Since, as discussed above, some broadband polarizing beamsplitters, for example, based on wire grid or nano-grid polarizers, provide higher extinction in transmission (i.e., transmission of the p-polarized state) than in reflection (i.e., reflection of the s-polarized state) and, as a result, the purity of the transmitted p-polarized state (i.e., the ratio of p-polarized light to s-polarized light transmitted by the polarizing beamsplitter) can be higher than the purity of the reflected s-polarized state (i.e., the ratio of s-polarized light to p-polarized light reflected by the polarizing beamsplitter) clean up polarizer 662 is utilized to filter light reflected from polarizing beamsplitter 642 along the fourth optical path before the filtered light impinges on camera 664. Thus, camera 664 captures an image of the specimen at 135° polarization.

Utilizing four-camera polarization-resolved imaging system 628, the specimen can be imaged with diverse polarization states and angles of illumination, thereby acquiring information related to the 3D density and anisotropy of the specimen. During imaging, at each illumination angle, four-camera polarization-resolved imaging system 628 is utilized to collect through-focus intensities from four polarization sensitive detection channels associated with cameras 636, 646, 654, and 664, respectively. In order to provide 3D reconstructions, specimen holder 614 is translated along the z-direction to enable imaging of different x-y planes within the specimen.

As described herein, each set of polarization channels is transformed into the Stokes parameters through the pre-calibrated instrument matrix, $A\alpha$, to represent the state of scattered light in each focal plane under each illumination. Then, the deconvolution algorithm described herein is utilized to convert these Stokes parameters associated with different illumination angles (i.e., multiple sets of Stokes parameters arrayed by the angle of illumination) into the 3D density and anisotropy information of the specimen.

Although the embodiment illustrated in FIG. 6 utilizes detection of linearly polarized light along 0°, 45°, 90°, and 135°, embodiments of the present invention are not limited to this particular implementation. The design of four-camera polarization-resolved imaging system 628 may be modified to encode other polarization states or focal planes.

The images recorded by the four cameras of four-camera polarization-resolved imaging system 628 may have spatial mis-registration even after careful alignment. Accordingly, transformation matrices can be calculated that will align the $I_{45}°$, $I_{90}°$, and $I_{135}°$ channels to the $I_0°$ channel.

The theoretical Rayleigh resolution limit is given by $r=0.61\lambda/NA$. At $\lambda=530$ nm, used for this measurement, the theoretical resolution is $r=270$ nm. The inventors have determined that in one implementation using single camera (FIG. 3B), the imaging system meets the resolution limit in all four channels.

The ability of a polarized microscope to detect weakly birefringent materials is typically limited by the extinction ratio it can achieve. The extinction ratio is defined as the ratio of maximum to minimum intensity that is detected. The calibration tensor enables us to correct the imbalances in the extinction ratio introduced by change in angles of illumination.

Utilizing high speed cameras, high speed operation is enabled, for example, at 70 frames/second or higher frame rates, for instance at thousands or tens of thousands of frames per second. Thus, embodiments of the present invention can utilize parallel detection paths over large fields of view to provide high-speed imaging of 3D orientation in a 2D space.

The measurements of density, anisotropy, and 3D orientation demonstrate a measurement of a tensor field throughout the volume: three spatial dimensions (x-y-z) define the volume and components of the second rank permittivity tensor encode the magnitude of anisotropy, the in-plane orientation of the optic axis or the symmetry axis, and the out-of-plane orientation of the symmetry axis. These tensor field measurements are illustrated in FIGS. 7A-7F.

The multi-camera polarization-resolved imaging system illustrated in FIG. 6 is useful for imaging unlabeled specimens. Additionally, embodiments of the present invention can be utilized with labeled specimens to obtain images of phase, principal retardance, and 3D orientation. Microscopic imaging of hematoxylin and eosin (H&E) stained histological sections has been used in the diagnosis of many diseases including many kinds of cancers. Because of their usefulness, pipelines to generate these sections including proper tissue storage, clearing, staining, and diagnosis tool are well-established. Embodiments of the present invention provide complementary information to the existing H&E stained specimens and provide at least two appealing advantages. First, the complementary information provided by embodiments of the present invention may help discover new phenotypes in histology for better diagnosis of diseases. Second, the use of embodiments of the present invention to image H&E stained sections enable us to utilize embodiments of the present invention on a broad set of existing processed tissue sections.

In order to utilize H&E stained specimens, illumination source 610 can emit illumination light at wavelengths near and in the infrared region of the spectrum, for example, at 770 nm. At 770 nm, the strong absorption associated with the H&E stains is reduced or eliminated, thereby preserving the accuracy of the models described herein, which may rely on the assumption of weak light-matter interactions to properly extract the physical properties of the specimens and be adversely impacted by strong absorption in the specimen. By utilizing illumination light at 770 nm, images of phase, principal retardance, and 3D orientation for H&E stained specimens can be obtained.

The wavelength of the illumination light is not limited to 770 nm and, depending on the particular application and the particular specimen, other wavelengths may be utilized. As an example, in relation to imaging of H&E stained specimens, spectral bands in which absorption of the illumination light by the H&E stains is acceptable (e.g., less than 10%) and detectors (e.g., CMOS cameras) are available may be utilized, for instance, wavelengths in the range of 650 nm to 1 µm, to reduce H&E stain related absorption to levels suitable for the models described herein. Accordingly, utilizing embodiments of the present invention, H&E images showing histological structures, such as nuclei, collagen fibers, sarcomeres (z-discs, A-bands, and I-bands), and intercalated discs can be obtained.

FIG. 7A is an image of density of a birefringent test target according to an embodiment of the present invention. In our reconstruction, we show that the optic axis of the material is perpendicular to the direction of the spoke feature. We also measure that the photolithographic features have lower density (lower phase) relative to the surrounding material.

For the measurement of the birefringent test target, an oil-immersion objective with a detection NA of 1.47 was utilized in combination with the illumination patterns illustrated in FIG. 2C, i.e., one brightfield and eight rotating sector illumination patterns. The illumination patterns are projected through an oil immersion condenser lens with an illumination NA of 1.4. The birefringent test target utilized was fabricated to have the optic axis or symmetry axis of sub-resolution features perpendicular to the spoke direction. The material is negatively uniaxial, i.e., its refractive index along the symmetry axis (indicated by white arrow in the legend) is smaller than the refractive index perpendicular to the symmetry axis. This type of birefringent test target can be fabricated using femtosecond laser writing technology. As demonstrated in FIGS. 7A-7F, the optic axis of the material is aligned perpendicular to the direction of the spoke features. These figures also demonstrate that the laser imprinted region has a negative density compared to the surrounding material. Referring to FIGS. 7A and 7B, the features formed by the femtosecond laser are orthogonal to the direction of the spokes.

FIG. 7B is a cross-sectional view of density in the third dimension for the birefringent test target according to an embodiment of the present invention. As illustrated in FIG. 7B, the features formed by the femtosecond laser are orthogonal to the direction of the spokes for this cross-section in the x-z plane.

FIG. 7C is an image of anisotropy of the birefringent test target according to an embodiment of the present invention. FIG. 7D is a cross-sectional view of anisotropy in the third dimension for the birefringent test target according to an embodiment of the present invention. As shown in FIGS. 7C and 7D, each of the spokes in the birefringent test target demonstrates higher anisotropy than the surrounding material.

FIG. 7E is an image of 3D orientation of the birefringent test target according to an embodiment of the present invention. FIG. 7F is a cross-sectional view of 3D orientation in the third dimension for the birefringent test target according to an embodiment of the present invention. Referring to FIG. 7E, the orientation of the anisotropy in each of the spoke features is shown, with each of the sets of opposing spokes being oriented to align with different directions measured in x-y-z dimensions. As an example, the azure colored spokes along x-axis in FIG. 7E, generally has the anisotropy aligned with a y-axis oriented at $\omega \sim 90°$ and $\theta \sim 90°$ according to our coordinate system defined in FIG. 4B.

Figure 7H:
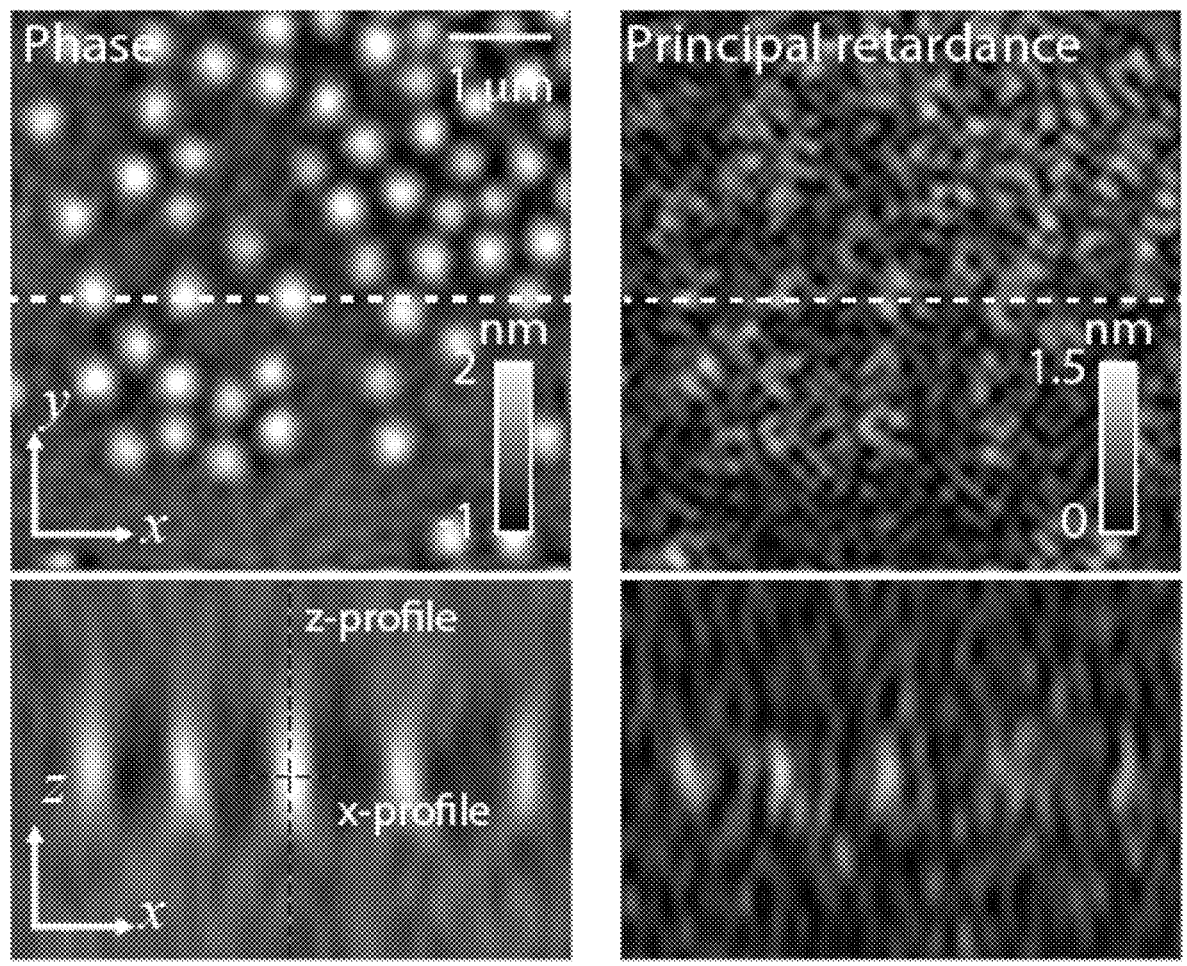
FIG. 7H illustrates phase and principal retardance measurements according to an embodiment of the present invention.

FIG. 7G is an orientation color sphere for interpretation of FIGS. 7E and 7F. In the top sphere, the y-axis points away from the viewer, defining a right-hand coordinate system. The RGB color shown on the color sphere encodes for two dimensions, azimuth in the XY plane relative to x-axis, $\omega \in [0°, 180°)$ and inclination out of XY plane relative to z-axis, $\theta \in [0°, 180°]$. We show four different perspectives of the color-spheres with rotations around Z axes to clarify which colors correspond to which pairs of azimuth and inclination, e.g., azure (R=0,G=0.5,B=1) represents ($\omega \sim 90°$, $\theta \sim 90°$),
red (R=1, G=0, B=0) represents ($\omega \sim 0°$, $\theta \sim 45°$),
blue (R=0,G=0,B=1) represents ($\omega \sim 45°$, $\theta \sim 135°$),
orange (R=1,G=0.5,B=0) represents ($\omega - 0°$, $\theta \sim 90°$),
green (R=0, G=1, B=0) represents ($\omega - 135°$, $\theta \sim 45°$), and
magenta (R=1, G=0, B=1) represents ($\omega - 45°$, $\theta \sim 45°$);

In order to characterize the spatial resolution provided by embodiments of the present invention, imaging of 300 nm polystyrene beads embedded in oil with the refractive index of 1.5536 was performed. FIG. 7H illustrates phase and principal retardance measurements for 300 nm polystyrene beads immersed in oil with a refractive index of 1.5536. The phase image of the polystyrene beads enables the resolving of individual beads and shows dense centers associated with the beads. The principal retardance images resolves the edges of the beads in the form of small rings.

To quantify the resolution provided by embodiments of the present invention, the phase of a bead was utilized to form Gaussian fits in the x and z directions. The Gaussian fits were deconvolved with the physical size of the bead to measure the shape and full width at half maximum (FWHM) of the point spread function (PSF) in x and z. The FWHM of this PSF in the x and z directions indicates that embodiments of the present invention can achieve a transverse FWHM of 230 nm and an axial FWHM of 810 nm. It should be noted that the theoretical transverse FWHM is 190 nm (i.e., $0.51\lambda/NA$) and the theoretical axial FWHM is 543 nm (i.e., $2\lambda/NA^2$). Thus, the measured transverse FWHM and axial FWHM compare well with the expected FWHM. Moreover, the results indicate that the deconvolution algorithm and parameters utilized by embodiments of the present invention do not introduce artifacts. Accordingly, embodiments of the present invention enable the ability to resolve cross-sections of single axons, bands of sarcomeres, and intra-cellular features.

Using the 3 µm polystyrene beads embedded in oils of varying refractive indices (RI), the accuracy of phase and principal retardance can be characterized. The refractive index of the polystyrene beads is known to be $n_{beads}=1.5956$ at a wavelength of 532 nm. Embedding the beads in media of varying RI (e.g., from 1.5536 to 1.5826) changes the accumulated optical path length (i.e., the theoretical phase) of the light as well as the amount of edge retardance linearly. When the refractive index of the surrounding media is the same as the refractive index of the beads, there will be no accumulated phase and edge retardance. Thus, such an embedding series allows the characterization of the linearity of the phase and principal retardance measured using embodiments of the present invention. In the phase images of the beads, phase values dropped as the refractive index of the immersion oil approaches the refractive index of the bead. A similar trend is observed in the edge retardance signal from the principal retardance measurements. Plotting the theoretical phase and the measured phase versus the difference of the refractive index between beads and oils, the inventors determined that the measured phase matches well with the theoretical phase. Moreover, edge retardance varies linearly with the difference of the refractive index between beads and oils.

The measurements of density, anisotropy, and 3D orientation demonstrate a measurement of a tensor field throughout the volume: three spatial dimensions (x-y-z) define the volume and components of the second rank permittivity tensor encode the magnitude of anisotropy, the in-plane orientation of the optic axis or the symmetry axis, and the out-of-plane orientation of the symmetry axis. These tensor field measurements are illustrated in FIGS. 8A-8I.

FIG. 8A is an image of density of a specimen according to an embodiment of the present invention. This figure shows the 2D and 3D imaging of density, anisotropy, and 3D orientation of a part of mouse brain tissue section. The 2D experiment is done with illumination and detection NA of 0.55. The 3D experiment is done with illumination NA of 1.4 and detection NA of 1.47. The density, which is equivalent to the index of refraction integrated over the optical path length, can also be referred to as the phase. The specimen shown in FIGS. 8A-8I is a small region of a mouse brain tissue section. The region of the mouse brain tissue section illustrated is on the Anterior Commissure Olfactory Limb portion of the brain, which consists of bundles of axons. The myelin sheath of an axon contributes a high birefringent signal and can be modeled as a negative uniaxial material, where the direction of anisotropy points toward the direction of the axon, i.e., a negatively uniaxial material with the orientation of optic axis parallel to the axon direction. It should be noted that the axon, in lower-resolution imaging condition, can be modeled as negatively uniaxial material. However, in high-resolution imaging condition, we are resolving the myelin sheath around the axon, which itself is considered as positively uniaxial material. As demonstrated herein, embodiments of the present invention are able to resolve individual axons in the density and anisotropy measurements and map the synaptic connectivity between neurons without the use of labels. In the higher-resolution imaging condition (FIGS. 8C, 8F, and 8I), we are able to resolve individual axons and the corresponding myelin sheath wrapping around it.

The reconstructed 3D orientation of the myelin sheath rotates as we traverse the sheath around a single axon. In lower-resolution imaging condition (FIGS. 8A, 8D, and 8G), the myelin sheath shell is not resolved. The overall birefringent signal of the myelin sheath is averaged over the region of a point spread function. The averaged material (axon) behaves optically like a negatively uniaxial material. Hence, we reconstruct the orientation of the optic axis with the assumption of negatively uniaxial material in the low-resolution imaging condition. As illustrated herein, the individual axons are resolved in the density and anisotropy channel. The value shown in the 3D orientation enables us to trace the direction of individual axons.

Referring to FIGS. 8A, 8D, and 8G, two dimensional images were obtained with an illumination and detection NA of 0.55. FIGS. 8B, 8C, 8E, 8F, 8G, and 8H are three dimensional measurements on smaller regions of FIGS. 8A, 8D, and 8G obtained with illumination NA of 1.4 and detection NA of 1.47. From the value shown in the 3D orientation, we are able to trace the direction of individual axons. As illustrated in FIG. 8A, a region is imaged in the x-y plane with a scale bar of 60 μm. Portion 810 is enlarged in FIG. 8B.

FIG. 8B is an enlarged image of the density of the specimen shown in FIG. 8A. As illustrated in FIG. 8B, the variations in density in the image demonstrate the presence of individual axons. The enlarged image in FIG. 8B has a scale bar of 10 μm. Thus, embodiments of the present invention provide image resolution for 3D density, anisotropy, and orientation that is not available using conventional techniques.

FIG. 8C is a cross-sectional view of density in the third dimension for the specimen according to an embodiment of the present invention. The cross section illustrated in FIG. 8C is obtained for sample line 812 in FIG. 8B. Since the measurements are made in three dimensions as the specimen is translated to different axial positions along the z-axis, FIG. 8C illustrates how the material present at the cross-section associated with sample line 812 varies as a function of position along the z-axis.

FIG. 8D is an image of anisotropy of the specimen according to an embodiment of the present invention. The anisotropy, which is equivalent to the birefringence integrated over the optical path length and can also be referred to as the principal retardance, arises in FIG. 8D, as discussed above, from aggregated layers of the myelin sheath. In contrast with measurement methods that measure the projection of the anisotropy vector in the focal plane, embodiments of the present invention provide the actual 3D anisotropy. Thus, whereas projection-based measurements will be biased if the structure is aligned with the optical or longitudinal (i.e., axial) axis of the imaging system, in which case the specimen will appear to be isotropic, the methods and systems described herein provide the anisotropy in all three dimensions, enabling quantitative determination of 3D orientation and degree of myelination.

As shown in FIG. 8D, the anisotropy varies as a function of position in the x-y plane with a highly anisotropic structure present in portion 820. The anisotropy illustrated in FIG. 8D is proportional to the degree of myelination for the axons. Portion 820 is enlarged in FIG. 8E.

FIG. 8E is an enlarged image of the anisotropy of the specimen shown in FIG. 8D. As illustrated in FIG. 8E, the highly anisotropic structure can be visualized as it results from the presence of individual axons.

FIG. 8F is a cross-sectional view of anisotropy in the third dimension for the specimen according to an embodiment of the present invention. The cross section illustrated in FIG. 8F is obtained for sample line 822 in FIG. 8E.

FIG. 8G is an image of 3D orientation of the specimen according to an embodiment of the present invention. The color of the image indicates the direction along which the symmetry axis of the material is aligned, which can be referred to as the orientation of optic axis. At this spatial resolution, we assume that the biological material is negatively uniaxial, i.e., the material is denser perpendicular to its symmetry axis than parallel. This is accurate for axon, whose symmetry axis is along its length, and which is denser perpendicular to symmetry axis due to tight wrapping of myelin sheath. The azimuth of the orientation is associated with the x-axis and the inclination of the orientation is associated with the z-axis. Referring to FIG. 4B, the direction shown in FIG. 8G, referenced by the orientation color sphere illustrated in FIG. 8J, is the direction aligned with the optic axis of the material. Thus, the green color in FIG. 8G identifies the direction in which the axon bundle is pointing. As illustrated in FIG. 8G, the axon bundle has the anisotropy aligned with a direction oriented at ω~135° and 0-45° according to our coordinate system defined in FIG. 4B.

FIG. 8H is an enlarged image of the 3D orientation of portion 830 of the specimen shown in FIG. 8G. At this spatial resolution, we assume that the biological material is positively uniaxial, i.e., the material is denser parallel to its symmetry axis. The myelin sheath is a stack of lipid bilayers around the axon, whose symmetry axis is along the stacking direction (perpendicular to the axon). The myelin sheath is dense along its symmetry axis. Using the orientation color sphere illustrated in FIG. 8J, the orientation of the myelin stacks resolved in FIG. 8E can be determined.

FIG. 8I is a cross-sectional view of 3D orientation in the third dimension for the specimen according to an embodiment of the present invention. The cross section illustrated in FIG. 8I is obtained for sample line 832 in FIG. 8H.

FIG. 8J is an orientation color sphere for interpretation of FIGS. 8G-8I. The RGB color shown on the color sphere encodes for two dimensions, azimuth in the plane and inclination out of plane. The color code is the same as in FIG. 7G and as described.

With the reconstruction of 3D density, an extra 3D segmentation algorithm was utilized to segment out the myelin sheath structure and estimate the normal direction of this cylindrical structure. FIG. 8K is a reconstructed image of 3D density for the specimen according to an embodiment of the present invention. FIG. 8L is a segmentation map after 3D segmentation according to an embodiment of the present invention. FIG. 8M is a histogram of 3D orientation computed from spatial distribution of density according to an embodiment of the present invention.

FIG. 8N is a reconstructed image of 3D anisotropy for the specimen according to an embodiment of the present invention. FIG. 8P is a histogram of 3D orientation corresponding to anisotropy according to an embodiment of the present invention. Comparing to the 3D orientation from the birefringent signal, the 3D orientation histograms from both sources show similar angular distribution of the feature. Thus, our measurements of the 3D orientation of optic axis are consistent with the orientation of the morphology of the sample.

Figure 9:
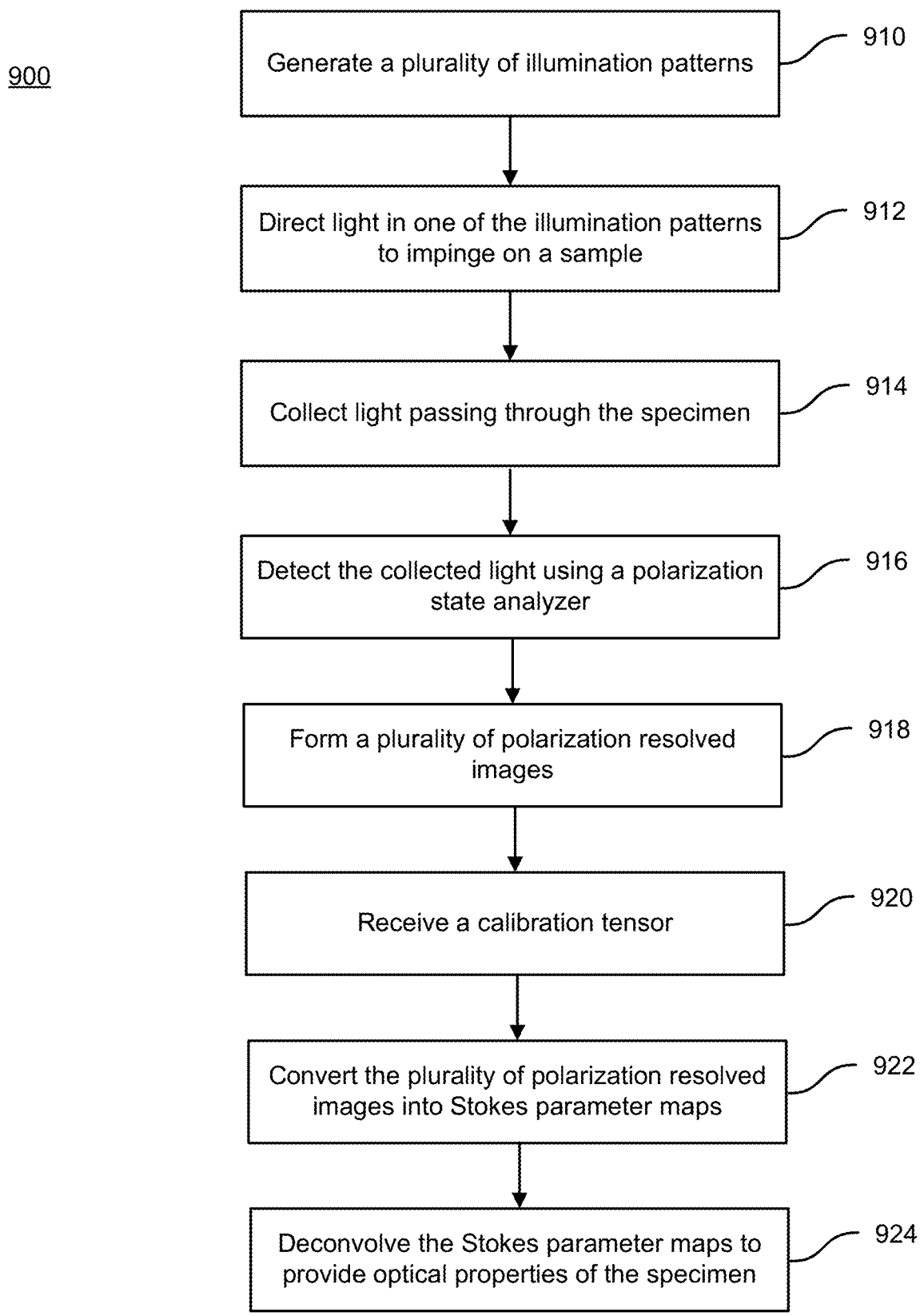
FIG. 9 is a simplified flowchart illustrating a method of measuring optical properties of a specimen according to an embodiment of the present invention.

FIG. 9 is simplified flowchart illustrating a method of measuring optical properties of a specimen according to an embodiment of the present invention. Referring to FIG. 9, the method 900 includes generating a plurality of illumination patterns incident on the specimen (910). The specimen can be a primary cell such as microglia or other in vivo samples of a living animal. As discussed in relation to FIGS. 2A-2D, a plurality of different illumination patterns can be generated and utilized. In some embodiments, each of the plurality of different illumination patterns is rotated through in turn as the light in the illumination pattern is directed to impinge on the sample (912) and the measurements are made. The method also includes, for each of the plurality of illumination patterns, collecting sample light passing through the specimen (914) and detecting the collected sample light using a polarization state analyzer (916) to form a plurality of polarization channels (918). Collecting sample light can include focusing the sample light onto image sensors of the polarization state analyzer.

The plurality of polarization channels can be obtained using a variety of different imaging systems. As an example, imaging systems using multiple cameras, each associated with a different polarization state can be used. In this embodiment, the method can include translating the sample, collecting additional sample light passing through the specimen, and detecting the additional collected sample light using the polarization state analyzer to form a plurality of additional polarization channels. For this imaging implementation, the specimen is disposed in an image plane and translating the sample comprises motion orthogonal to the image plane.

Alternatively, a single camera with pixel sets that includes four polarization-resolved pixels can be used. Moreover, a single camera that obtains images of light in different polarization states sequentially can be utilized. As discussed above, the specimen can be translated to provide a plurality of polarization channels for each angle of illumination and each specimen position. One of ordinary skill in the art would recognize many variations, modifications, and alternatives.

The method further includes receiving a calibration tensor (920). The calibration tensor is associated with the imaging optics and can compensate for polarization aberrations in the imaging optics. The method also includes converting the plurality of polarization channels for each of the illumination patterns and each of the specimen positions into Stokes parameter maps using the calibration tensor (922) and deconvolving the Stokes parameter maps to provide density, anisotropy, and orientation measurements of the specimen (924).

It should be appreciated that the specific steps illustrated in FIG. 9 provide a particular method of measuring optical properties of a specimen according to an embodiment of the present invention. Other sequences of steps may also be performed according to alternative embodiments. For example, alternative embodiments of the present disclosure may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

As discussed above, the 5-dimensional array of images can be obtained in several ways, including modification of the angularly defined illumination angles followed by positioning of the specimen at multiple z-positions or positioning of the specimen at multiple z-positions followed by modification of the angularly defined illumination angles. One of ordinary skill in the art would recognize many variations, modifications, and alternatives.

Figure 10:
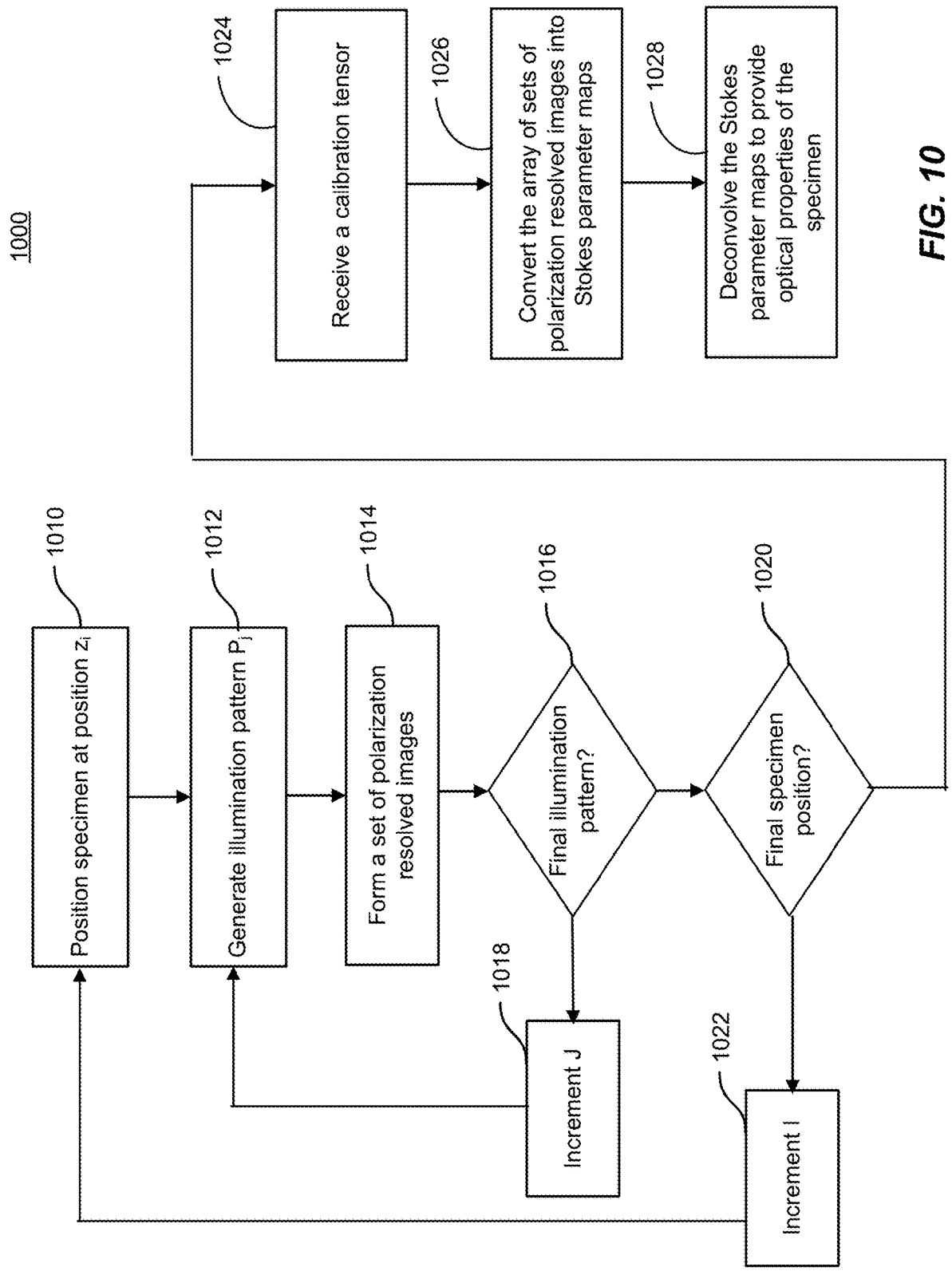
FIG. 10 is a simplified flowchart illustrating a method of measuring optical properties of a specimen according to another embodiment of the present invention.

FIG. 10 is a simplified flowchart illustrating a method of measuring optical properties of a specimen according to another embodiment of the present invention. The method 1000 includes a) positioning the specimen (e.g., a primary cell) at a predetermined axial position $z_i$ (1010), b) generating a predetermined illumination pattern $P_j$ (1012), c) directing the predetermined illumination pattern $P_j$ to be incident on the specimen, d) collecting sample light passing through the specimen, and e) forming a set of polarization channels of the specimen associated with the predetermined axial position and the predetermined illumination pattern (1014). The specimen can be disposed in an image plane orthogonal to the predetermined axial position. As discussed in relation to FIG. 6, motion of the specimen stage along the axial axis z can be utilized to achieve this first position Illumination pattern $P_j$ can be an illumination pattern defined by a predetermined angular distribution with respect to the axial axis. As discussed above, the set of polarization channels can be detected using a polarization state analyzer and images collected that are associated with light that is linearly polarized along 0°, 45°, 90°, and 135° directions.

The method also includes determining if the final illumination pattern has been generated (1016) and f) incrementing j to j+1 to define a series of updated predetermined illumination patterns $P_{j+1}$ (1018) until all illumination patterns have been generated. The predetermined illumination patterns can alternatively include a set of sector illumination patterns and a circular illumination pattern as illustrated in FIG. 2C. In this embodiment, each of the sector illumination patterns is contiguous with adjacent sector illumination patterns. The predetermined illumination patterns can include a set of annular sector illumination patterns, an annular illumination pattern, and a circular illumination pattern as illustrated in FIG. 2D.

Thus, using this method will enable g) repeating b) through f) a plurality of times to provide multiple sets of polarization channels of the specimen at the position Thus, multiple sets of polarization channels can be obtained, with each set of polarization channels being associated with one of the plurality of angularly defined illumination patterns. As illustrated in FIGS. 1A and 1B, the set of polarization channels typically includes a set of four polarization channels, for example, a first image obtained using light having a polarization state aligned with 0°, a second image obtained using light having a polarization state aligned with 45°, a third image obtained using light having a polarization state aligned with 90°, and a fourth image obtained using light having a polarization state aligned with 135°.

Forming the set of polarization channels of the specimen can include capturing an image of the specimen using a set of four cameras as illustrated in FIG. 3A. In this embodiment, each camera of the set of four cameras is operable to image one of four distinct polarization states. Alternatively, forming the set of polarization channels of the specimen can include capturing an image of the specimen using a single camera having a polarization-resolved pixel format as illustrated in FIG. 3B.

After all of the illumination patterns have been generated, the method further includes determining if the final specimen position has been achieved (1020) and h) incrementing i to i+1 to define an updated predetermined axial position $z_{i+1}$ (1022) until all specimen positions have been achieved. Thus, using this method will enable repeating a) through h) a plurality of times to provide an array of multiple sets of polarization channels of the specimen.

The method also includes receiving a calibration tensor (1024), converting the array of multiple sets of polarization channels into Stokes parameter maps using the calibration tensor (1026), and deconvolving the Stokes parameter maps to provide 3D density, 3D anisotropy, and 3D orientation measurements of the specimen (1028).

It should be appreciated that the specific steps illustrated in FIG. 10 provide a particular method of measuring optical properties of a specimen according to another embodiment of the present invention. Other sequences of steps may also be performed according to alternative embodiments. For example, alternative embodiments of the present disclosure may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
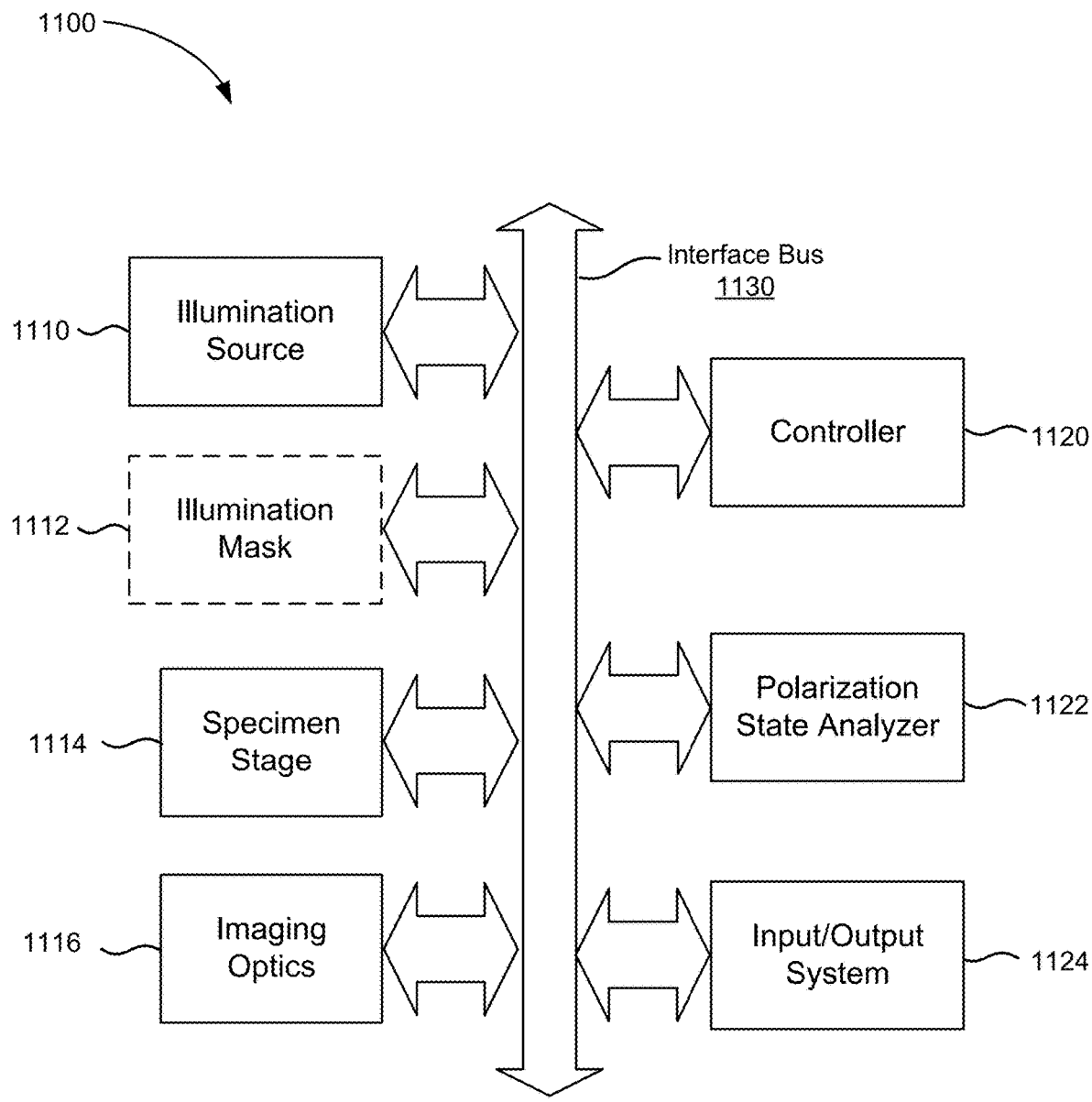
FIG. 11 is a simplified schematic diagram illustrating a polarization-resolved imaging system according to an embodiment of the present invention.

FIG. 11 is a simplified schematic diagram illustrating a polarization-resolved imaging system according to an embodiment of the present invention. The polarization-resolved imaging system 1100 includes an illumination source 1110, which can function in conjunction with an optional illumination mask 1112. As discussed in relation to FIGS. 2A-2D, illumination light from illumination source 1110 can be generated in illumination patterns, with light propagating at various angles of illumination for each of the illumination patterns. The patterns can be sequentially generated to provide multiple sets of polarization channels for each of the illumination patterns. Optional illumination mask 1112 can be used to generate illumination light with a predetermined polarization state, for example, circular polarization.

Polarization-resolved imaging system 1100 also includes specimen stage 1114. Light propagating at the various angles of illumination can impinge on a specimen supported on specimen holder 1114, which can also be referred to as a sample stage. Light scattered as it passes though the specimen is collected by imaging optics 1116, which can include objective 125 as illustrated in FIGS. 1A and 1B. Imaging optics 1116 serve to focus the light scattered from the specimen at an image plane, which typically serves as the camera port of the microscope.

Polarization-resolved imaging system 1100 further includes controller 1120, polarization state analyzer 1122, and an input/output system 1124. The various elements of polarization-resolved imaging system 1100 are connected via interface bus 1130, which provides for control and data signals to be transmitted to/from and received to/from one or more of the various elements. Polarization state analyzer 1122 can take several forms, including multiple cameras, each associated with a different polarization state, a single camera with pixel sets that includes four polarization-resolved pixels, or a single camera that obtains images of light in different polarization states sequentially.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system comprising:
   an illumination source;
   a specimen stage operable to support a specimen;
   imaging optics;
   a polarization state analyzer optically coupled to the imaging optics; and
   one or more processors in communication with the illumination source and the polarization state analyzer, the one or more processors configured to perform operations comprising:
   generating a plurality of illumination patterns;
   rotating a calibration target at a plurality of orientations for each illumination pattern;
   receiving an array of multiple sets of polarization channels from the polarization state analyzer;
   converting multiple sets of polarization-resolved images at known orientations of a calibration target into a calibration tensor for each illumination pattern of the plurality of illumination patterns;
   converting the array of multiple sets of polarization channels into Stokes parameter maps; and
   deconvolving the Stokes parameter maps to provide a volumetric map of the permittivity tensor of the specimen to measure 3D density, 3D anisotropy, and 3D orientation of the specimen.

2. The system of claim 1 wherein the specimen is a uniaxial specimen.

3. The system of claim 1 wherein the 3D density of the specimen defines absorption and optical path length characteristics, the 3D anisotropy of the specimen defines principal retardance and optic sign, and the 3D orientation of the specimen defines azimuth and inclination of the specimen.

4. The system of claim 1 wherein the one or more processors are further configured to polarize the plurality of illumination patterns.

5. The system of claim 1 wherein the polarization state analyzer comprises a set of polarization processing optics and set of four cameras, each camera of the set of four cameras being operable to image light in one of four distinct polarization states.

6. The system of claim 5 wherein each set of polarization-resolved images comprises:
 a first image obtained using light having a circular polarization state;
 a second image obtained using light having an elliptical polarization state aligned with 0°:
 a third image obtained using light having an elliptical polarization state aligned with 60°; and
 a fourth image obtained using light having an elliptical polarization state aligned with 120°.

7. The system of claim 5 wherein the polarization state analyzer further comprises:
 a beamsplitter operable to direct light along a first optical path or a second optical path;
 a first polarizing beamsplitter disposed along the first optical path and operable to direct light having a first polarization state to a first lens and a first camera and light having a third polarization state orthogonal to the first polarization state to a third lens and a third camera;
 a half wave plate disposed along the second optical path; and
 a second polarizing beamsplitter disposed along the second optical path and operable to direct light having a second polarization state to a second lens and a second camera and light having a fourth polarization state orthogonal to the second polarization state to a fourth lens and a fourth camera.

8. The system of claim 1 wherein the polarization state analyzer comprises a single camera having a polarization-resolved pixel format.

9. The system of claim 1 wherein;
 the plurality of illumination patterns comprise a plurality of angularly defined illumination patterns; and
 each set of polarization channels includes a plurality of images associated with different angularly defined illumination patterns.

10. The system of claim 9 wherein the array of multiple sets of polarization channels are arrayed as a function of axial positions of the specimen.

11. The system of claim 9 wherein each set of polarization channels comprises:
 a first image obtained using light having a polarization state aligned with 0°;
 a second image obtained using light having a polarization state aligned with 45°;
 a third image obtained using light having a polarization state aligned with 90°; and
 a fourth image obtained using light having a polarization state aligned with 135°.

12. The system of claim 1 wherein converting the array of multiple sets of polarization channels into Stokes parameter maps comprises using an inverse of the calibration tensor.

13. The system of claim 1 wherein the specimen comprises cells, tissue, or biopsy obtained from a living animal without a fluorescent label.

14. The system of claim 1 further comprising a reflection source and fluorescence imaging path coupled to the reflection source.

15. The system of claim 14 wherein the fluorescence imaging path is operable to perform concurrent imaging using the illumination source without label and the fluorescence imaging path with label.

16. The system of claim 15 wherein concurrent imaging comprises simultaneous imaging.

17. The system of claim 14 wherein the fluorescence imaging path is operable to perform sequential imaging using the illumination source without label and the fluorescence imaging path with label.

18. A system comprising:
 an illumination source;
 a specimen stage operable to support a specimen;
 imaging optics;
 a beam splitter;
 a first polarizing beam splitter;
 a second polarizing beam splitter;
 a half wave plate;
 a set of four cameras, each camera of the set of four cameras being operable to image light in one of four distinct polarization states; and
 one or more processors in communication with the illumination source and the set of four cameras, the one or more processors configured to perform operations comprising:
  generating a plurality of illumination patterns;
  rotating a calibration target at a plurality of orientations for each illumination pattern;
  receiving, using the set of four cameras, multiple sets of polarization channels;
  converting, using a calibration tensor, the multiple sets of polarization channels into Stokes parameter maps; and
  deconvolving the Stokes parameter maps to compute 3D density, 3D anisotropy, and 3D orientation of the specimen.

19. The system of claim 18 wherein:
 the beam splitter is operable to direct light along a first optical path or a second optical path;
 the first polarizing beamsplitter is disposed along the first optical path and operable to direct light to a first camera of the set of four cameras and a third camera of the set of four cameras;
 the half wave plate is disposed along the second optical path; and
 the second polarizing beamsplitter is disposed along the second optical path and operable to direct light to a second camera of the set of four cameras and a fourth camera of the set of four cameras.

20. The system of claim 18 further comprising a fluorescent excitation source operable to illuminate the specimen through the beam splitter and the imaging optics.

* * * * *